United States Patent [19]

Seidner et al.

[11] Patent Number: 5,244,981
[45] Date of Patent: Sep. 14, 1993

[54] SILICONE-CONTAINING CONTACT LENS POLYMERS, OXYGEN PERMEABLE CONTACT LENSES AND METHODS FOR MAKING THESE LENSES AND TREATING PATIENTS WITH VISUAL IMPAIRMENT

[75] Inventors: Leonard Seidner, Brooklyn, N.Y.; Harry J. Spinelli, Wilington, Del.; Mohammed I. Ali, Aberdeen; Lester Weintraub, Mount Laurel, both of N.J.

[73] Assignee: Permeable Technologies, Inc., Morganville, N.J.

[21] Appl. No.: 507,613

[22] Filed: Apr. 10, 1990

[51] Int. Cl.$^5$ ............................................. C08F 283/00
[52] U.S. Cl. .................................. 525/479; 523/107; 526/279
[58] Field of Search ..................... 525/479; 523/107; 526/279

[56] References Cited

U.S. PATENT DOCUMENTS

| | | | |
|---|---|---|---|
| 4,248,989 | 2/1981 | Novicky | 526/264 |
| 4,254,248 | 3/1981 | Friends et al. | 525/479 |
| 4,508,884 | 4/1985 | Wittmann et al. | 526/279 |
| 4,814,402 | 3/1989 | Nakashima et al. | 523/107 |
| 4,933,406 | 6/1990 | Anan et al. | 523/107 |
| 4,977,229 | 12/1990 | Culberson et al. | 525/479 |
| 4,990,561 | 2/1981 | Yosioka | 525/479 |
| 5,019,628 | 5/1991 | Spinelli | 525/288 |
| 5,057,578 | 10/1991 | Spinelli | 525/278 |

FOREIGN PATENT DOCUMENTS

| | | |
|---|---|---|
| 0108886 | 5/1984 | European Pat. Off. . |
| 0193725 | 9/1986 | European Pat. Off. . |
| 0258065 | 2/1988 | European Pat. Off. . |
| 0361929 | 4/1990 | European Pat. Off. . |
| 0406161 | 1/1991 | European Pat. Off. . |
| 0420686 | 4/1991 | European Pat. Off. . |
| 0422805 | 4/1991 | European Pat. Off. . |
| 0452097 | 10/1991 | European Pat. Off. . |
| 0452098 | 10/1991 | European Pat. Off. . |
| 63-291925 | 11/1988 | Japan . |
| 1-644640 | 1/1989 | Japan . |
| WO85/05373 | 12/1985 | PCT Int'l Appl. . |
| 1419669 | 12/1975 | United Kingdom . |

*Primary Examiner*—Melvyn I. Marquis
*Assistant Examiner*—Margaret W. Glass
*Attorney, Agent, or Firm*—Henry D. Coleman; R. Neil Sudol

[57] ABSTRACT

The present invention relates to novel copolymers and contact lenses made from these copolymers comprising preformed silicone-containing acrylic star polymers and macromonomers, preparation of these contact lenses and a therapeutic method for treating patients with visual impairment.

Described is a copolymer comprising at least about 10% by weight of a preformed silicone-containing acrylic copolymer and no more than about 90% by weight of a matrix formed from the random polymerization of a mixture of monomers. The mixture of monomers comprises at least one monomer selected from the group consisting of silicone acrylates, esters of alpha, beta-unsaturated acids and wetting monomers. The preformed silicone-containing acrylic copolymer is preferably copolymerized throughout the matrix. The copolymer is readily machined into gas permeable contact lenses exhibiting substantially enhanced characteristics of at least one of the characteristic group of oxygen permeability, hardness and machineability relative to contact lenses formed from the random polymerization of monomers.

41 Claims, 7 Drawing Sheets phenyltetraethyldisiloxanylethyl methacrylate triphenyldimethyldisiloxanylmethyl acrylate isobutylhexamethyltrisiloxanylmethyl methacrylate methyldi(trimethylsiloxy)-methacryloxymethylsilane n-propyloctamethyltetrasiloxanylpropyl methacrylate pentamethyldi(trimethylsiloxy)-acryloxymethylsilane t-butyltetramethyldisiloxanylethyl acrylate n-pentylhexamethyltrisiloxanylmethyl methacrylate tri-i-propyltetramethyltrisiloxanylethyl acrylate pentamethyldisiloxanylmethyl methacrylate heptamethyltrisiloxanylethyl acrylate tris(trimethylsiloxy)-gamma-methacryloxypropylsilane phenyltetramethyldisiloxanylethyl acrylate

SILICONE-CONTAINING CONTACT LENS POLYMERS, OXYGEN PERMEABLE CONTACT LENSES AND METHODS FOR MAKING THESE LENSES AND TREATING PATIENTS WITH VISUAL IMPAIRMENT

FIELD OF THE INVENTION

Acrylic star polymers containing single and multifunctional monomers in the core and their preparation by group transfer polymerization are described by Spinelli in U.S. Pat. No. 4,810,756 (Mar. 7, 1989) and in U.S. Pat. No. 4,659,782 (Apr. 21, 1987). The present invention relates to contact lens copolymers, contact lenses comprising silicone-containing acrylic star polymers and macromonomers, preparation of these copolymers and contact lenses and a therapeutic method for treating patients with visual impairment.

BACKGROUND OF THE INVENTION

Walter E. Becker, in U.S. Pat. No. 3,228,741 (1966), discloses polysiloxane polymers for use in elastomeric contact lenses exhibiting exceptionally high oxygen permeability.

Charles S. Cleaver, in U.S. Pat. No. 3,981,798 (1976), discloses random copolymers produced from the copolymerization of perfluoroalkyl alkyl methacrylates or fluorine-containing telomer alcohol methacrylates and methylmethacrylate for use in rigid gas permeable contact lenses.

N. E. Gaylord, in U.S. Pat. No. 3,808,178 (1974) and Re 31,406 (1983), discloses random copolymers of polysiloxanyl acrylates and alkyl acrylic esters made by free radical polymerization for use in contact lenses.

N. E. Gaylord, in U.S. Pat. No. 4,120,570 (1978), describes a method for treating patients with visual defects by fitting them with rigid gas permeable contact lenses made from random copolymers of polysiloxanyl acrylates and alkyl acrylic esters.

N. E. Gaylord, in U.S. Pat. No. 3,808,179 (1974) discloses random copolymers produced from the copolymerization of fluoroacrylates and esters of acrylic acid and methacrylic acid for use in rigid gas permeable contact lenses.

K. A. Andrianov, et al., *Bull. Acad. Sci. USSR Chem.*, No. 4, pp 467–472 (1957) describes the synthesis and polymerization of Organosilicone Compounds containing a methacrylol group.

R. L. Merker, et al., *Journal of Organic Chemistry*, 21, 1537 (1956) describes the synthesis and physical characteristics of copolymers of silicone acrylates and methyl methacrylate.

E. J. Ellis et al., in U.S. Pat. No. 4,152,508 (1979), discloses copolymers of siloxanyl alkyl acrylates, an itaconate ester, and an ester of acrylic or methacrylic acid. The copolymers preferably include a cross linking agent and a hydrophilic monomer.

E. R. Martin, in U.S. Pat. No. 3,878,263 (1975), discloses polysiloxane polymers obtained by equilibrating a mixture containing an acrylate-functional silane or siloxanes and a cyclic organopolysiloxane in the presence of a base catalyst and an aprotic solvent.

G. D. Friends et al., in U.S. Pat. No. 4,254,248 (1981), disclose copolymers prepared from monomeric polysiloxanes endcapped with activated double bonds and polycyclic esters of acrylic or methacrylic acid.

W. S. Covington, in U.S. Pat. No. 4,245,069 (1981), discloses copolymers and terpolymers of an addition cross-linked polysiloxane and one or more acrylic or methacrylic esters of certain hydroxy or alkoxy alcohols.

W. G. Deichert et al., in U.S. Pat. No. 4,189,546 (1980), disclose crosslinked networks prepared from a poly(organosiloxane) monomer alpha, omega-terminally bonded through divalent hydrocarbon groups to free radical-polymerizable unsaturated groups. Homopolymers and copolymers are disclosed.

A. Aoki et al., in U.S. Pat. No. 4,304,881 (1981), disclose the preparation of styrene/butadiene "living" polymers by anionic polymerization and coupling of these polymers by reaction with silicone tetrachloride to produce a 4-arm star polymer having a silicone atom as a core.

O. W. Webster, in U.S. Pat. Nos. 4,417,034 (1983) and 4,508,880 (1985) and W. B. Farnham and D. Y. Sogah in U.S. Pat. Nos. 4,414,372 (1983) and 4,524,196 (1985) disclose the preparation of acrylic star polymers using group transfer polymerization by coupling "living" polymer with a capping agent having more than one reactive site or by initiating polymerization with an initiator which can initiate more than one polymer chain. Initiators that could produce acrylic star polymers with up to 4 arms were demonstrated.

H. J. Spinelli, in U.S. Pat. Nos. 4,659,782 and 4,659,783 issued (1987), teaches the preparation of acrylic star polymers with crosslinked cores and at least 5 arms, optionally having functional groups in the cores and/or the arms. Group transfer polymerization being preferably used to make the polymers is disclosed.

As is true for most bio-medical applications, polymers that are to be used in contact lens applications have very demanding requirements placed on them. For example, rigid gas permeable contact lenses, like other contact lenses, not only must be hard and machineable, but also highly oxygen permeable. In addition, these lenses must be comfortable to wear. Furthermore, these contact lenses should have the characteristics of good flex resistance, adequate wettability and non-adherence to the eye. It is also important that the lenses maintain their shape after extended use. Finally, the lenses should be resistant to deposits of proteins, lipids, and bacteria.

In the case of soft contact lenses, these should be oxygen permeable, drapeable, wettable, durable, have adequate tear-strength, clarity and resistance to deposits of proteins, lipids and bacteria.

Initially, contact lenses were made from polymethylmethacrylate (PMMA), a hard, easily machineable polymer. These lenses were reasonably comfortable to wear but were not sufficiently permeable to oxygen. Consequently, they could be worn only for limited periods of time. Wearing such lenses for prolonged periods of time sometimes resulted in serious eye damage.

The next generation of lenses were the soft lenses made from polyhydroxyethylmethacrylate (PHEMA) containing high concentrations of water. These hydrogels transport more oxygen than does PMMA because the polymers accommodate large concentrations of water, but the lenses are difficult to manufacture and handle because of their softness. The increased oxygen transport is associated with the solubility of oxygen in water rather than to the polymer per se. In addition to being soft and deformable, the hydrogels from PHEMA are very susceptible to deposits and lack tear resistance.

The most recent generation of lenses, the rigid, oxygen-permeable lenses, are made from random copolymers of silicone acrylates and methylmethacrylates such as TRIS(trimethylsiloxy)-3-methacryloxypropylsilane (TRIS) and methyl methacrylate. These lenses have a significantly higher oxygen permeability than lenses made from either PMMA or PHEMA hydrogels. Lenses made from TRIS homopolymer have very high oxygen permeability but they are soft, lack wettability, do not resist deposits well, and are very uncomfortable to wear. Using TRIS copolymerized with methyl methacrylate increases the durability and machinability, but there is a trade-off in other properties, most notably the oxygen permeability. The manufacturer can provide lenses with high silicone content that can be worn for extended periods of time but are very difficult to make or harder lenses with relatively high methyl methacrylate content that are more easily machineable but have reduced oxygen permeability.

Other monomers that have been used in making contact lenses often improve one property at the expense of others. For example, hexafluorobutyl methacrylate (HFBMA) gives excellent resistance to deposits but is less oxygen permeable than are the silicone acrylates. Lenses made from dimethylsilicone elastomers have very high oxygen permeability but are very soft, and difficult to manufacture, extremely non-wettable, and very uncomfortable to wear.

One of the current processes for making materials for oxygen permeable contact lenses involves the bulk free radical copolymerization of an alkyl (meth)acrylate, for example methyl methacrylate, with a polysiloxanylalkyl ester of acrylate or methacrylate (silicone acrylate), among others, for example TRIS, and an amount of a polyfunctional monomer, such as ethyleneglycol dimethacrylate, to provide rigidity through crosslinking. As mentioned above, there results a trade-off in properties depending upon the relative proportions of the monomers used. It was originally believed that lens materials having high oxygen permeability and improved hardness and machinability could be made by incorporating a hard polymer such as PMMA in the bulk polymerization of a silicone acrylate with an alkyl acrylic ester. It has been found, however, that PMMA is not soluble in silicone acrylate monomers nor in their mixtures with alkyl acrylic esters; nor has it been possible to incorporate PMMA in the highly oxygen permeable dimethylsilicone elastomers.

Surprisingly, pre-formed macromonomers and star polymers of the present invention can be dissolved or dispersed in silicone acrylate monomers, wetting monomers such as hydroxyethylmethacrylate, glycerol methacrylate, polyvinyl alcohols, polyvinylpyrrolidone and methacrylic acid, among others, and/or mixtures of such monomers with alkyl acrylic esters. The copolymers of the present invention may be adapted for use in hard, flexible or soft contact lenses. It has been found that bulk polymerization of these mixtures gives products with attractive properties including optical clarity, suitable hardness (in the case of rigid gas permeable lenses), and enhanced oxygen permeability, for use in making hard, flexible and soft contact lenses.

OBJECT OF THE PRESENT INVENTION

It is an object of the present invention to provide novel polymer compositions which can be used to make hard, flexible or soft gas permeable contact lenses.

It is another object of the present invention to provide methods for improving the oxygen permeability and/or machinability of polymerized acrylates and methacrylates for use in contact lenses.

It is an additional object of the present invention to provide methods for improving the oxygen permeability and tear resistance of soft contact lens copolymers.

It is still a further object of the present invention to provide wettable copolymers which can be used to produce wettable contact lenses according to the present invention.

It is yet another object of the present invention to provide oxygen-permeable, wettable, transparent copolymers which can be cast, molded or machined to provide improved hard, flexible or soft contact lenses.

It is still an additional object of the present invention to provide novel methods of polymerization related to the bulk polymerization of monomers in combination with macromonomers and star polymers of the present invention.

It is a further object of the present invention to provide methods for correcting visual defects in patients suffering from visual impairment by fitting the eyes of these patients with the contact lenses of the present invention.

These and other objects of the present invention are apparent from the description of the present invention which is set forth in detail herein.

SUMMARY OF THE INVENTION

The present invention relates to novel copolymers containing macromonomers and acrylic star polymers copolymerized throughout a polymer matrix and contact lenses made from these novel copolymers. The novel polymers of the present invention comprise novel silicone-containing acrylic polymers which are obtained from the copolymerization of pre-formed macromonomers and/or acrylic star polymers with monomers of the polymer matrix, for example, silicone acrylates, esters of acrylic and/or methacrylic acid ((meth)acrylates), wetting agents and/or crosslinking agents, among others.

In certain embodiments according to the present invention, the copolymers contain pre-formed silicone-containing macromonomers incorporated into, and preferably polymerized throughout, a polymer matrix. Macromonomers of the present invention are linear homopolymers, block polymers or random copolymers preferably having a polymerizable olefinic group at the end of the polymer chain. Preferably, the macromonomers are preformed block copolymers comprised primarily of silicone acrylates and non-silicone acrylates having a terminal double-bond-containing organo group. The double-bond-containing organo group is generally linked to the end of the macromonomer by means of a urethane, ester, ether or amide linkage. The polymerizable group may be, for example, a double bond from a methacryloxy, an acryloxy, a styrenic, an alpha methyl styrenic, an allylic, vinylic or other olefinic group.

In certain preferred embodiments, these pre-formed macromonomers comprise a random or block polymer derived from a mixture of monomers comprising:

a) about 0% to about 90%, preferably about 25 to about 75% by weight of one or more monomers according to the Structure:

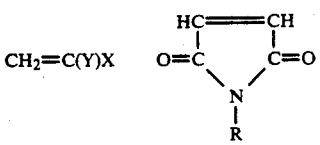

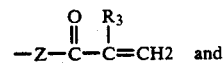

ii. about 0% to about 99% by weight of one or more monomers, each having one group according to the Structure:

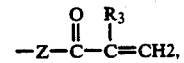

and mixtures thereof wherein:

X is —CN, —CH=CHC(O)X' or —C(O)X';

Y is —H, —CH$_3$, —CN or —CO$_2$R, provided, however, when X is —CH=CHC(O)X', Y is —H or —CH$_3$;

X' is —OSi(R)$_3$, —R, —OR or —NR'R''; each R is independently selected from C$_{1-20}$ alkyl, alkenyl, or alkadienyl; C$_{6-20}$ cycloalkyl, aryl, alkaryl or aralkyl, any of said groups optionally containing one or more ether oxygen atoms within aliphatic segments thereof and optionally containing one or more functional substituents that are unreactive under polymerizing conditions; and each of R' and R'' is independently selected from C$_{1-4}$ alkyl;

b) about 10 to about 100%, preferably about 25% to about 75% by weight of one or more polysiloxanylalkyl esters of alpha, beta unsaturated acids having the Structure:

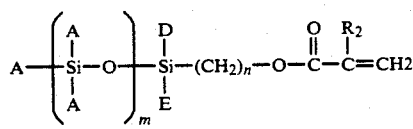

where D and E are selected from the class consisting of C$_{1-5}$ alkyl groups, phenyl groups, and G groups; G is a group of the structure:

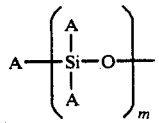

A is selected from the class consisting of C$_{1-5}$ alkyl groups and phenylgroups; m is an integer from one to five; n is an integer from one to three; R$_2$ is H or CH$_3$; and c) attached to one end of said random or block polymer a terminal organo group having a polymerizable carbon-carbon double bond, preferably attached through a urethane, ester, amide or ether grouping.

In additional aspects of the present invention, the novel polymers comprise pre-formed silicone-containing acrylic star polymers incorporated into, and preferably copolymerized throughout, a polymer matrix. These pre-formed star polymers are comprised of a crosslinked core derived from one or more esters of acrylic or methacrylic acid ((meth)acrylate) monomers and a plurality of linear copolymeric arms having an unattached free end attached to the core. The arms of the star polymer may be derived from at least one silicone acrylate and/or at least one ester of an alpha, beta unsaturated acid.

These star polymers comprise:

a. a crosslinked core comprising a polymer derived from a mixture of monomers comprising:

i. about 1% to about 100% by weight of one or more monomers, each having at least two groups:

in which R$_3$ is the same or different and is H, CH$_3$, CH$_3$CH$_2$, CN, or COR' and Z is O, or NR' and b. attached to said core (a), random or block polymer chains that are derived from a mixture of monomers comprising:

i) about 0–90% by weight of one or more monomers having the formula:

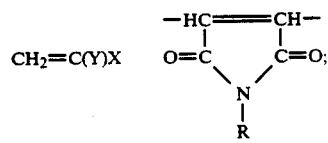

and mixtures thereof wherein:

X is —CN, —CH=CHC(O)X' or —C(O)X';

Y is —H, —CH$_3$, —CN or —CO$_2$R, provided, however, when X is —CH=CHC(O)X', Y is —H or —CH$_3$;

X' is —OSi(R)$_3$, —R, —OR or —NR'R''; each R is independently selected from C$_{1-10}$ alkyl, alkenyl, or alkadienyl or C$_{6-20}$ cycloalkyl, aryl, alkaryl or aralkyl, any of said groups optionally containing one or more ether oxygen atoms within aliphatic segments thereof and optionally containing one or more functional substituents that are unreactive under polymerizing conditions; and each of R' and R'' is independently selected from C$_{1-4}$ alkyl, joined to a block comprising:

ii) about 10–100% by weight of one or more silicone acrylates having the Structure:

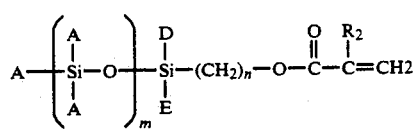

where D and E are selected from the class consisting of C$_1$–C$_5$ alkyl groups, phenyl groups, and G groups; G is a group of the structure

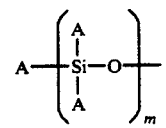

A is selected from the class consisting of C$_1$–C$_5$ alkyl groups and phenyl groups;

m is an integer from one to five; and n is an integer from one to three; and c. attached to said random or block polymer (b), an organo group containing a polymerizable carbon-carbon double bond, which group is preferably connected through a urethane, ester, amide or ether grouping.

Preferably, in the pre-formed star polymers, at least 5 of the arms are present, and most preferably substantially all of the arms have their unattached ends terminated with an organo group containing a polmerizable carbon-carbon double (olefinic) bond. Such double bonds permit the pre-formed star polymer to copolymerize with other monomers to form the novel copolymers of the present invention. This copolymerization results in a novel polymer with improved resistance to extraction and greater reinforcement of properties, such as toughness and machineability, in the polymer combination.

Copolymers of the present invention comprise a polymer formed by the copolymerization of preformed macromonomers or star polymers as described above in combination with at least one monomer selected from the group consisting of polysiloxanylalkyl esters of alpha, beta unsaturated acids such as acrylic and methacrylic acid, among others (silicone acrylates), esters of alpha, beta-unsaturated acids including acrylic and methacrylic acid, wetting agents and crosslinking agents, and mixtures thereof. The weight ratio of the macromonomer, star polymer and other monomers may be readily varied to produce the copolymers of the present invention.

The copolymers according to the present invention find utility in a number of diverse applications including contact lenses, release coatings, ocular membranes, intraocular implants, sizing agents, electronics adhesives, gas and liquid separation membranes, prostheses and etching resists, among others. Copolymers according to the present invention find particular utility in contact lenses.

SUMMARY OF THE FIGURES

FIG. 2 is a graphic representation of permeability and hardness characteristics that are obtained at varying levels of TRIS monomer used in making a rigid gas permeable contact lens from the random copolymerization of methylmethacrylate and TRIS. The hardness values are set forth as Shore D hardness and the permeability values are set forth as:

$$Dk = \times 10^{11} \frac{cm^3 cm}{s\ cm^2 mm\ Hg}$$

Figure 3:
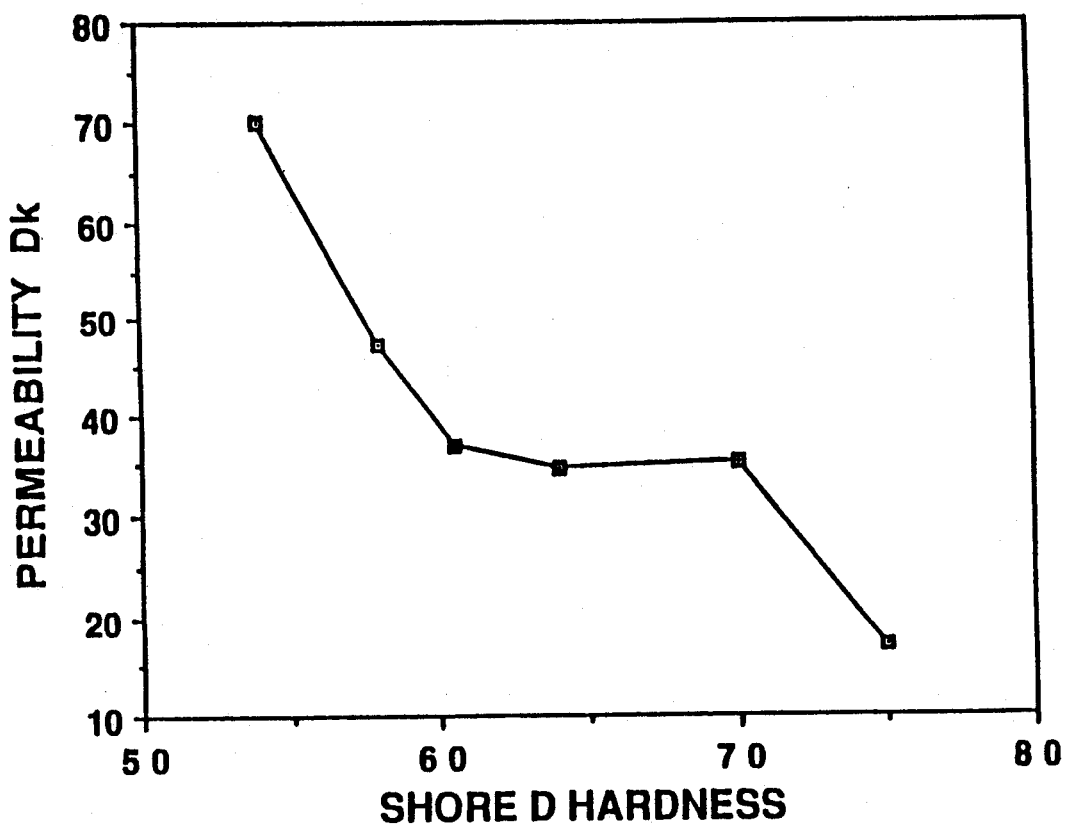

FIG. 3 is a graphic representation of the permeability versus hardness that is obtained for contact lenses made from random copolymers of methylmethacrylate and TRIS. The hardness values are set forth as Shore D hardness and the permeability values are set forth as:

$$Dk = \times 10^{11} \frac{cm^3 cm}{s\ cm^2 mm\ Hg}$$

Figure 4:
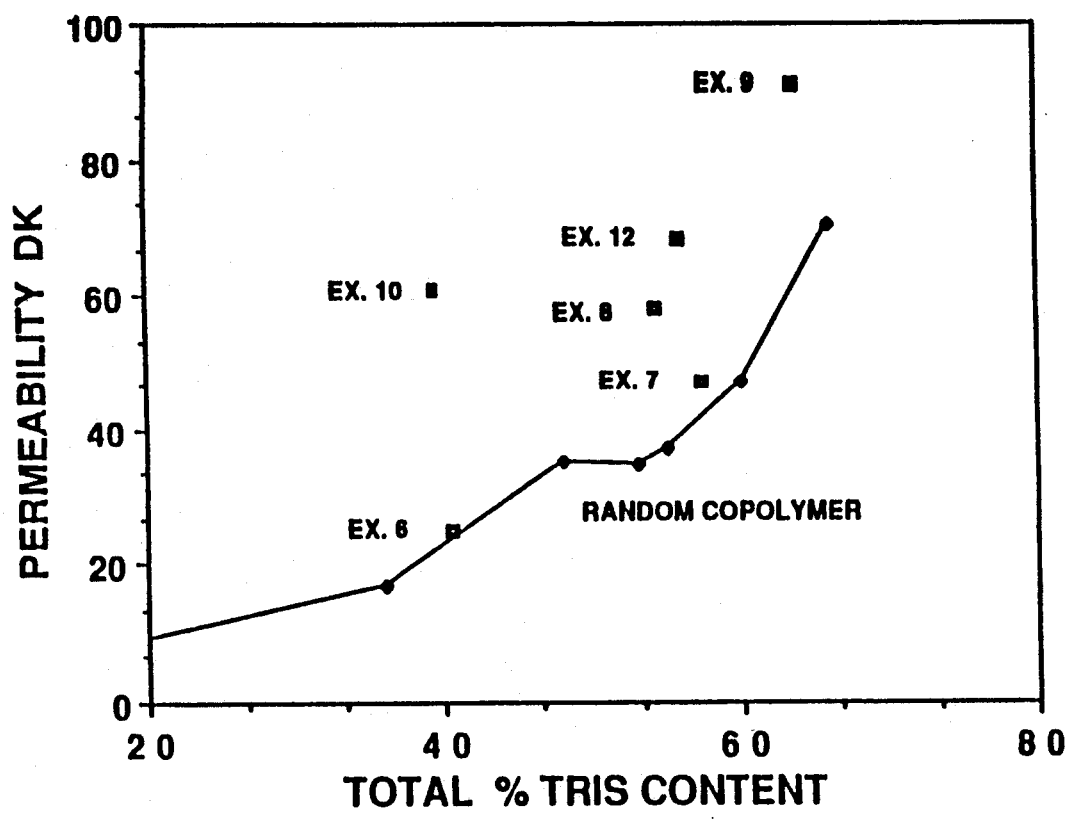

FIG. 4 is a graphic representation of the permeability obtained at varying levels of TRIS monomer for lenses made from conventional random copolymers (open squares on line) or formulas made according to the present invention. As in FIGS. 2 and 3, the permeability values are set forth as:

$$Dk = \times 10^{11} \frac{cm^3 cm}{s\ cm^2 mm\ Hg}$$

Figure 5:
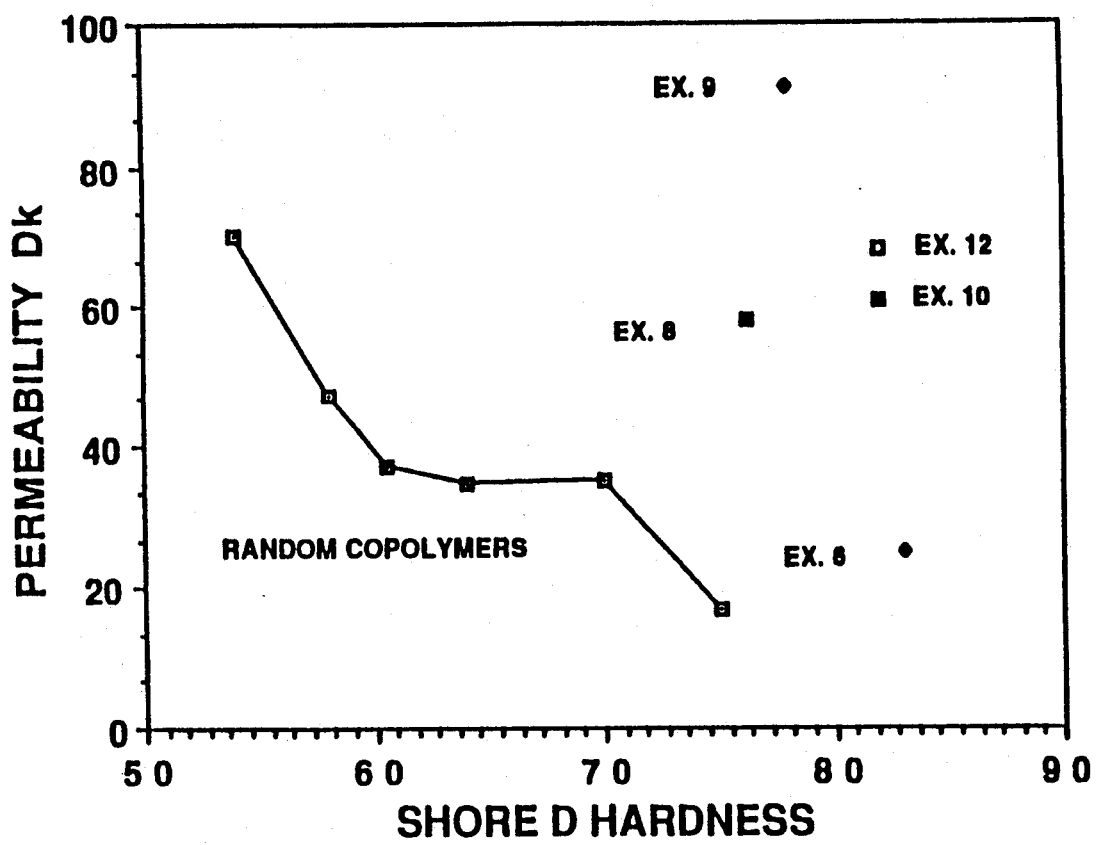

FIG. 5 represents a comparison of permeability versus hardness for lenses made from either conventional random copolymers and formulations made according to the present invention. The hardness values are for a Shore D hardness and the permeability values are set forth as:

$$Dk = \times 10^{11} \frac{cm^3 cm}{s\ cm^2 mm\ Hg}$$

DETAILED DESCRIPTION OF THE PRESENT INVENTION

For purposes of clarity, throughout the discussion of the present invention, the following definitions will be used:

The term "copolymer" is used throughout the specification to describe a polymer that results from the polymerization of at least two different monomers. The term copolymer includes polymers of the present invention obtained by the bulk polymerization of monomers and the macromonomers and/or star polymers of the present invention.

The term "monomer" is used throughout the specification to describe chemical compounds containing at least one polymerizable double bond that are the non-preformed building blocks of copolymers. Monomers include silicone acrylates, esters of alpha, beta-unsaturated acids including esters of acrylic and methacrylic acid ((meth)acrylates) such as methyl methacrylate, among others, fluoroacrylates, wetting monomers and crosslinking monomers, among others.

The term "macromonomer" is used throughout the specification to describe pre-formed linear silicone-containing acrylic homopolymers, block polymers or random copolymers that preferably have a polymerizable group at one end of the polymer chain and are used in the contact lens polymers of the present invention. In preferred embodiments, the polymerizable group of the macromonomer may be a double bond from a methacryloxy, an acryloxy, a styrenic, an alpha methyl styrenic, an allylic, a vinylic or other olefinic group. Although macromonomers for use in the present invention preferably have only one polymerizable group at the end of the polymer chain, in certain embodiments it may be advantageous for the macromonomer to contain more than one polymerizable group. It is also possible, although less preferable, to utilize a macromonomer containing an absence of polymerizable groups which is simply dispersed throughout the polymer matrix of the copolymers of the present invention.

The term "star polymer" is used throughout the specification to describe high molecular weight silicone-containing polymers for use in the present invention that have a multitude of linear, acrylic arms radiating out from a central core. The arms are linear polymers that can be homopolymers, copolymers or block polymers and may have functional groups in addition to, or other than optional double bonds located at the end of the arms or distributed along the chain. The cores are highly crosslinked segments of difunctional acrylates or copolymers of monofunctional and difunctional acrylates. The star polymers of the present invention may be dispersed or preferably copolymerized throughout the matrix of copolymers of the present invention.

The terms "preformed silicone-containing acrylic copolymer", "preformed silicone-containing copolymer" and "preformed copolymer" are used throughout the specification to describe the macromonomers and star polymers used in the copolymers of the present invention. These macromonomers and star polymers are derived from esters of alpha, beta unsaturated acids such as methyl methacrylate and silicone acrylates such as TRIS, among other monomers. These preformed copolymers generally contain at least about 10% by weight silicone acrylates.

The term "matrix" is used throughout the specification to describe that part of the copolymer that results from the random polymerization of monomers selected from the group consisting of silicone acrylates, esters of alpha, beta-unsaturated acids, wetting monomers, crosslinking monomers, and mixtures thereof. These monomers are distinct from macromonomers or star polymers which are also incorporated into copolymers according to the present invention. The copolymer of the present invention comprises this matrix and macromonomer and/or star polymer dispersed or preferably copolymerized throughout the matrix.

The term "difunctional acrylate" is used throughout the specification to describe a chemical compound having at least two acrylate functionalities. In addition to being monomers, crosslinking monomers for use in the present invention are difunctional acrylates.

The term "silicone acrylate(s)" is used throughout the specification to describe polysiloxanylalkyl esters of alpha, beta unsaturated acids including acrylic and methacrylic acids that are included in macromonomers, star polymers and the matrix of the copolymers of the present invention.

The term "(meth)acrylate(s)" is used throughout the specification to describe esters of acrylic and methacrylic acid.

The term "non-silicone ester(s)" is used throughout the specification to describe esters of alpha, beta-unsaturated acids including esters of acrylic and methacrylic acid that are including the macromonomers, star polymers and polymer matrix of the copolymers of the present invention.

The term "fluoro acrylate(s)" is used throughout the specification to describe esters of alpha, beta unsaturated acids including acrylic and methacrylic acid which contain fluorine that may be included in the copolymers, including the macromonomer, the star polymers and the polymer matrix to provide deposit resistance and enhanced oxygen permeability relative to alkyl esters of alpha, beta unsaturated acids.

Copolymers of the present invention comprise a polymer comprising a macromonomer and/or a star polymer preferably copolymerized throughout a polymer matrix comprising at least one monomer selected from the group consisting of silicone acrylates, esters of alpha, beta-unsaturated acids, wetting monomers and mixtures thereof. In certain preferred embodiments, the polymer matrix includes at least one additional monomer selected from the group consisting of crosslinking monomers and fluoroacrylates and mixtures thereof, among others.

In synthesizing the macromonomers, star polymers and the polymer matrix of copolymers of the present invention, esters of alpha, beta-unsaturated esters and preferably esters of acrylic and methacrylic acid, are used. Representative esters of acrylic and methacrylic acid which are used in the present invention include, for example, methyl methacrylate, butyl methacrylate, sorbyl acrylate and methyacrylate; 2-(dimethylamino)ethyl methacrylate, 2- (dimethylamino)ethyl acrylate; 3,3-dimethoxypropyl acrylate; 3- methacryloxypropyl acrylate; 2-acetoxyethyl methacrylate; p-tolyl methacrylate; methylene malononitrile; ethyl 2-cyanoacrylate; N,N-dimethyl acrylamide; 4-fluorophenyl acrylate; 2-methacryloxyethyl acrylate and linoleate; propyl vinyl ketone ethyl 2-chloroacrylate; glycidyl methacrylate; 3-methoxypropyl methacrylate; 2[(1-propenyl)oxylethyl methacrylate and acrylate; phenyl acrylate; 2-(trimethyloloxy)ethyl methacrylate; allyl acrylate and methacrylate. Preferred monomers of this group include methyl methacrylate, glycidyl methacrylate; sorbyl methacrylate; ethyl acrylate, butyl acrylate; sorbyl acrylate; 2-(trimethylsiloxy)ethyl methacrylate; 2- methacryloxyethyl acrylate, 2-acetoxyethyl methacrylate; and 2-(dimethylamino)ethyl methacrylate, among others, including mixtures of these esters. Methyl methacrylate is most preferred.

In addition to the above, esters of itaconic acid, maleic acid and fumaric acid and related polymerizable esters of alpha, beta-unsaturated acids may also be used. One of ordinary skill in the polymer arts will recognize that the particular ester chosen for use in the macromonomers, the star polymers or for the matrix of the present invention may vary depending upon the type of characteristics desired for the individual components as well as the final copolymer.

For synthesizing macromonomers and star polymers according to the present invention, the amount of the non-silicone esters included will vary over a wide range as a function of the rigidity and oxygen permeability desired as well as the composition of the polymer matrix and the total amount of silicone acrylate included in the copolymers. Esters of acrylic and methacrylic acid are preferred. In general, a non-silicone ester of methacrylic or acrylic acid is included in the macromonomers or star polymers in an amount ranging from about 0% by weight up to about 90% by weight, with a preferred range of about 20% to about 80% by weight and a most preferred range of about 30% to about 60% by weight. Although in certain cases the amount of such ester included in the macromonomers and star polymers may be above or below the broadest range, practical problems related to the solubility and manufacturability of the contact lenses may occur.

In the copolymers of the present invention the amount of non-silicone ester included in the matrix portion generally ranges from about 5% to about 80% of the final weight of the matrix. Although the amount of such ester included within the polymer matrix may be above or below this range, in general, the mount used falls within this range to provide the necessary characteristics of enhanced permeability and acceptable durability and machining characteristics. In the copolymers of the present invention which include the matrix and macromonomer and/or star polymer, the total amount of non-silicone ester included ranges from about 5% up to about 90% by weight of the final copolymer.

The macromonomers, star polymers and matrix of the copolymers of the present invention also contain a silicone acrylate monomer in quantities sufficient to provide significantly enhanced oxygen permeability relative to PMMA. Representative silicone acrylates which are employed for use in the present invention include, for example, phenyltetraethyldisiloxanylether methacrylate, triphenyldimethyldisiloxanylmethyl acrylate, isobutylhexamethyltrisiloxanylmethyl methacrylate, methyldi(trimethylsiloxy)-methacryloxymethylsilane, n-propyloctamethyltetrasiloxanylpropylmethacrylate, pentamethyldi(trimethylsiloxy)-acryloxymethylsilane, t-butyltetramethyldisiloxanylethylacrylate, n-pentylhexamethyltrisiloxanylmethylmethacrylate, tri-i-propyltetramethyltrisiloxanylethyl acrylate, pentamethyldisiloxanylmethyl methacrylate, heptamethyltrisiloxanylethyl acrylate, tris(trimethylsiloxy-3-methacryloxypropylsilane and phenyltetramethyldisiloxanylethyl acrylate, among others, including mixtures of these silicone acrylates. Chemical structures of the above-named silicone acrylate monomers are presented in FIG. 1. Other silicone acrylates for use in the present invention include the alkoxysilicone acrylates, such as those described in U.S. Pat. No. 4,861,840 to Lim, et al., relevant portions of which are incorporated by reference herein.

Particularly preferred silicone acrylates for use in the macromonomers and star polymers include TRIS(-trimethylsiloxy)-3-methacryloxypropylsilane (TRIS). Preferred silicone acrylates for use in the polymer matrix of the present invention include TRIS (available as IGEL from IGE1 International, Leighton Buzzard, BEDS, England and PSX 200 TM, available from Petrarch Systems, Inc., Bristol, Pa., U.S.A.) and 3-[3-methacryloxypropyl-1,3,3-tris(trimethylsiloxy)-1-methyl-1-vinyldisiloxane ("VIN"-available in a mixture containing other silicone acrylates including TRIS as PSX 374 TM from Petrarch Systems, Inc.) and mixtures thereof. The use of VIN allows the incorporation of extremely high weight percentages of silicone to be included in the polymer without the necessity of adding a crosslinking monomer.

In the macromonomers and star polymers of the present invention, the amount of silicone acrylate used preferably ranges from about 10% to about 100% by weight, more preferably about 20% to about 85% by weight and most preferably about 40% to about 83% by weight. In the polymer matrix, the amount of silicone acrylate used generally ranges from about 20% to about 80% by weight, preferably about 40% to about 75% by weight of the polymer matrix. In the copolymer of the present invention, the silicone acrylates used comprise about 15% to about 80% by weight of the copolymer.

In certain embodiments fluorine containing esters of alpha, beta unsaturated acids, including for example, acrylic and methacrylic acid ("fluoro acrylates") may be added to the macromonomers, star polymers and the polymer matrix to provide deposit resistance and in certain cases, enhanced oxygen permeability characteristics in the final copolymers. These fluoro acrylates include for example, perfluoroalkyl alkyl methacrylates and acrylates, telomer alcohol acrylates and methacrylates including, for example, those disclosed by Cleaver in U.S. Pat. No. 3,950,315, additional fluoro acrylates of acrylic and methacrylic acid including, for example, 2,2,3,3,4,4,4-heptafluorobutyl acrylate, 2,2,3,4,4,4-hexafluorobutylmethacrylate as well as numerous additional fluoro acrylates. These fluoro acrylates may be included in the macromonomers and the star polymers for use in the copolymers of the present invention, but preferably, are polymerized with comonomers of the polymer matrix including silicone acrylates, esters of acrylic and methacrylic acid as well as other comonomers such as wetting monomers and crosslinking monomers. The above-described fluoro acrylates may be included in the copolymers of the present invention as substitutes for the silicone acrylates to provide enhanced deposit resistance but somewhat reduced oxygen permeability, relative to the silicone acrylates. When used, the amount of fluoro acrylates comprises about 2.0% to more than about 80% by weight of the copolymer and preferably comprises about 5% to about 12% by weight of the copolymer.

In addition to the use of silicone acrylates and/or non-silicone esters, the copolymers used to make the contact lenses of the present invention may also comprise at least one crosslinking monomer. Crosslinking monomers are generally used in the star polymers of the present invention and are optionally used in the macromonomers and polymer matrix of the present invention. In the polymer matrix crosslinking monomers are used especially when the amount of silicone acrylate exceeds about 25% by weight of the polymer matrix and about 20% by weight of the crosslinking monomer.

Exemplary crosslinking monomers have at least two polymerizable alpha, beta unsaturated acid esters or amides, and include, for example, ethylene dimethyacrylate, 1,3-butylene dimethacrylate, tetraethyleneglycol dimethacrylate (TEGMA), triethylene glycol dimethacrylate, trimethylolpropane trimethacrylate, ethylene glycol dimethacrylate (EGMA), 1,6-hexylene dimethacrylate, 1,4-butylene dimethacrylate, ethylene diacrylate 1,3-butylene diacrylate, tetraethyleneglycol diacrylate, triethylene glycol diacrylate, trimethylolpropane triacrylate, 1,6-hexylene diacrylate and 1,4-butylene diacrylate. The macromonomers of the present invention may contain a crosslinking monomer, especially in those macromonomers which exhibit considerable swelling when exposed to organic solvents. In certain cases it may be advantageous to add crosslinking agents to the macromonomers to reduce the swelling.

The polymer matrix generally includes a crosslinking monomer, expecially when the amount of silicone acrylate used in the polymer matrix is greater than about 20% by weight of the final copolymer. The amount of crosslinking monomer included in the polymer matrix generally ranges from about 0.5% to about 12.0% by weight of the copolymer and preferably ranges from about 2.0% to about 10.0% by weight of the copolymer. It is to be noted that in certain cases in which the silicone acrylate contains a vinylogous group in addition to the acrylate functionality, for example, when the silicone acrylate is 3-[3-methacryloxypropyl-1,3,3-tris(-trimethylsiloxy)-1-methyl-1-vinyldisiloxane (VIN, available as PSX 374 TM from petrarch Systems, Inc.), it may be unnecessary to include a crosslinking monomer in the polymer matrix portion, even at levels of silicone as high as or higher than about 70-75% by weight of the polymer matrix.

In general, the amount of crosslinking agent including in the star polymers according to the present invention ranges from about 0.5% to about 15.0%, preferably about 5% to about 10% by weight, depending upon the size of the core that is desired.

The copolymers of the present invention may also include sufficient quantities of a wetting monomer. The wetting monomer is included in the present invention to provide the contact lens with an ability to evenly disperse water on the surface of the contact lens. Exemplary wetting monomers for use in the present invention include acrylic acid, methacrylic acid, itaconic acid, fumaric acid, maleic acid, crotonic acid, N-vinylpyrrolidone, N-vinylpyridine, N-vinylcaprolactam, morpholine-containing wetting monomers, hydroxyalkylacrylates and methacrylates including hydroxyethyl methacrylate, hydroxyethylacrylate, hydroxypolyethoxyethylmethacrylate, polyethyleneoxide(meth)acrylate, among others, acrylamide, methacrylamide, N-methylolacrylamide, N-methylolmethacrylamide, glycidyl acrylate and methacrylate, dimethylaminoethylmethacrylate (DMAEMA), diethylaminoethylmethacrylate (DEAEMA), glycerol methacrylate and acrylate, among others. Preferred wetting monomers for use in the polymer matrix of the copolymers of the present invention include methacrylic acid, glycerol methacrylate, polyethyleneoxydimethacrylate and N-vinylpyrrolidone. Wetting monomers also may be included in the macromonomers and star polymers of the present invention. Of course, one of ordinary skill in the polymer arts will be able to chose the type and amount of wetting monomer for use in the macromonomers and star polymers of the present invention. Wetting monomer may be included in the polymer matrix in amounts ranging from about 0.5% to as high as about 80% or more, generally in amounts ranging from about 0.5% to about 30%, preferably about 5% to about 20% by weight of the final weight of the copolymer. The type and amount of wetting monomer chosen will be determined by the amount and type of silicone acrylate included in the final copolymer. Thus, as the amount of silicone increases, more wetting monomer may be included in the macromonomers, star polymers and polymer matrix to enhance the wetting of the lens. In certain particularly preferred embodiments, a combination of N-vinylpyrrolidone and methacrylic acid or methacrylic acid and glycerol methacrylate may be utilized in a combined weight ratio of about 5% to about 14% by weight of the copolymer.

Many of the same monomers included within the polymer matrix of the present invention may also be included in the macromonomers or star polymers of the present invention. Other useful ingredients and techniques for synthesizing macromonomers and star polymers will be found in U.S. Pat. No. 4,417,034 to Webster, which is incorporated by reference herein. Of particular note in synthesizing macromonomers and star polymers is the use of certain monomers described hereinabove whose function it is to improve wetting or deposit resistance. Preferred wetting monomers for this purpose include, for example, methacrylic acid, acrylic acid, dimethylaminoethyl methacrylate, diethylaminoethyl methacrylate and glyceryl methacrylate.

In the preparation of the macromonomer and acrylic star block copolymers of the present invention, use may be made of the "group transfer" polymerization process of the general type described in part by W. B. Farnham and D. Y. Sogah, U.S. Pat. No. 4,414,372 and by O. W. Webster, U.S. Pat. No. 4,417,034 and in continuation-in-part U.S. Pat. Nos. 4,508,880, Webster, granted Apr. 2, 1985, and 4,524,196 Farnham and Sogah, granted Jun. 18, 1985, all of which patents are incorporated by reference herein.

Initiators that are useful in the polymerization of the macromonomer and star polymers of the present invention include 1-(2-trimethylsiloxy)ethoxy-1-trimethylsiloxy-2-methylpropene, methoxy-2-methyl-1-propenyl)oxy]trimethylsilane; (trimethylsilyl)isobutyronitrile; ethyl 2-(trimethylsilyl)acetate; methyl 2-methyl-2-(tributylstannyl)propanoate; [(2-methyl-1-cyclohexenyl)oxy]tributylstannane; trimethylsilyl nitrile; methyl 2-methyl-2-(trimethylgermanyl)propanoate; [(4,5-dihydro-2-furanyl)oxy]trimethylsilane; [(2-methyl-1-propenylidene)bis(oxy)]bis[trimethylsilane]; [(2-methyl-1-[2-(methoxymethoxy)ethoxyl]-1-propenyl)oxy]trimethylsilane; methyl [(2-methyl-1-(trimethylxilyloxy)-1-propenyl)oxy]acetate; [(1-(methoxymethoxy)-2-methyl-1-propenyl)oxy]trimethylsilane; [(2-ethyl-1-propoxy-1-butenyl)oxy]-ethyldimethylsilane; ethyl 2-(trimethylstannyl)propanoate; [(2-methyl-1-butenylidene)bis(oxy)]bis[trimethylsilane]; 2-(trimethylsilyl)propanenitrile; ethyl(trimethylgermanyl)acetate; [(1-((1-dec-2-enyl)oxy)-2-methyl-1-propenyl)oxy]-trimethylsilane; phenyl 2-methyl-2-(tributylstannyl)-propanoate; methyl 2-(triethylsilyl)acetate; [(2-methyl-1-cyclohexeneyl)oxy[tributylstannane; [(1-methoxy-2-methyl-1-propenyl)oxy]phenyldimethylsilane.

Macromonomers are linear homopolymers, block polymers, or random copolymers that preferably have a polymerizable group at one end of the polymer chain. The polymerizable group may be a double bond from a methacryloxy, an acryloxy, a styrenic, an alpha methyl styrenic, an allylic, a vinylic, or other olefinic groups. Acrylic macromonomers can be prepared by the Group Transfer Polymerization process using functional initiators and a capping process to protect the functional group during polymerization, by anionic polymerization followed by a capping process (as described by Milkovich and Chiang, U.S. Pat. No. 3,786,116), by free radical polymerization using functional chain transfer agents followed by a capping process (as described by Gillman and Senogles *Polymer Lett.*, 5, 477 (1967)), or by free radical polymerization using special cobalt catalysts (as described by Rizzardo, et. al., *J. Macromol. Sci.-Chem.*, A23 (7), 839–852 (1986)). Group Transfer polymerization is the prefered method for making these macromonomers. The macromonomers used in the copolymers according to the present invention are also described in U.S. Pat. No. 5,057,578 entitled, "Silicone Containing Block Copolymers Macromonomers," issued Oct. 15, 1991.

The macromonomer for use in the present invention generally range in molecular weight from about 1,000 to about 20,000. The prefered range is from about 5,000 to about 15,000. The molecular weight of the macromonomers may be determined using standard analytical techniques, including gel permeation chromatography, light scattering, and osmometry.

Useful macromonomer polymers for use in the present invention include but are not limited to the following [The values given represent the weight percent of each monomer in the polymer. A double slash indicates a separation between blocks, and a single slash indicates a random copolymer or random composition in a specific block];

| Type of Polymer | Composition | Block Next to Double Bond | Molecular Weight Mn |
| --- | --- | --- | --- |
| MACRO MONOMER | TRIS//MMA 40//60 | TRIS | 6,600 |
| MACRO MONOMER | TRIS//MMA 40//60 | TRIS | 10,600 |
| MACRO MONOMER | TRIS//MMA 40//60 | TRIS | 15,500 |
| MACRO MONOMER | TRIS//MMA 25//75 | TRIS | 10,600 |
| MACRO MONOMER | TRIS//MMA 75//25 | TRIS | 13,300 |
| MACRO MONOMER | TRIS//MMA 75//25 | TRIS | 6,600 |

-continued

| Type of Polymer | Composition | Block Next to Double Bond | Molecular Weight Mn |
|---|---|---|---|
| MACRO MONOMER | TRIS//MMA 83//17 | TRIS | 9,800 |
| MACRO MONOMER | TRIS/MMA 83/17 | RANDOM | 9,000 |
| Prefered macromonomers are: | | | |
| MACRO MONOMER | TRIS//MMA 40//60 | TRIS | 10,600 |
| MACRO MONOMER | TRIS//MMA 25//75 | TRIS | 10,600 |

Such macromonomers are especially amenable for forming comonomer syrups for bulk polymerization to form copolymers for use in oxygen-permeable contact lenses.

Macromonomers that contain other functional monomers include: TRIS//DMAEMA macromonomer, p-DMAEMA macromonomer, and TRIS/MMA/-MAA/EGDM 65.6/18.7/5.1/10.6. The macromonomers of the present invention may be used alone or in combination with other random polymers, star polymers, and macromonomers for making copolymers of the present invention.

Star polymers are high molecular weight polymers that have a number of linear, acrylic arms radiating out from a central core. The arms are linear polymers that may be homopolymers, copolymers, or block polymers, and may have functional groups located at the end of the arms or distributed along the chain. The cores are highly crosslinked segments of difunctional acrylates or copolymers of monofunctional and difunctional acrylates. The manner in which star polymers of the present invention are prepared include the "arm-first", "core-first", and "arm-core-arm" methods, as described in Spinelli U.S. Pat. No. 4,810,756 which is incorporated herein by reference. Star polymers which are used in the novel copolymers are described in U.S. Pat. No. 5,019,628, entitled, "Silicone Containing Acrylic Star Polymers", issued May 28, 1991.

The molecular weight of the arms of the star polymers may range from about 1,000 to about 20,000. The prefered range is from about 5,000 to 14,000. The number of arms per star is dependent on the composition and process used to make the star. The number of arms that are present can be determined by dividing the molecular weight of the entire star by the molecular weight of the arms. The number of arms can range from about 5 to about 5,000. The preferred range is about 10 to about 200. The molecular weight of both the arms and the star can be determined by using standard analytical techniques, such as gel permeation chromatography, light scattering, and osmometry. Factors affecting the number and length of arms in star polymers of the present invention are the same as those described in U.S. Pat. No. 4,810,756.

Useful star polymers include but are not limited to the following [The values given represent the weight percent of each monomer in the polymer. A double slash indicates a separation between blocks, and a single slash indicates a random copolymer or random composition in a specific block]:

| Type of Polymer | Composition | Block Next to Double Bond* | Molecular Weight of Arm Mn |
|---|---|---|---|
| STAR | TRIS//MMA//EGDM 37.3//55.1//7.6 | TRIS | 8,600 |
| STAR | PENTA//MMA//EGDM 38.8//56.8//4.4 | PENTA | 9,900 |
| STAR | TRIS//MMA//EGDM 36.6//55.2//8.2 | TRIS | 10,000 |
| STAR | TRIS//MMA//EGDM 77.9//15.0//7.1 | TRIS | 10,200 |
| STAR | TRIS//MMA//EGDM 22.9//70.0//7.1 | TRIS | 10,000 |
| STAR | TRIS//MMA//EGDM 9.7//83.0//7.3 | TRIS | 9,200 |
| STAR | PENTA//MMA//EGDM 17.3//79.2//3.5 | PENTA | 14,200 |
| STAR | MMA//TRIS//EGDM 23.2//69.6//7.2 | MMA | 10,200 |
| STAR | MMA//TRIS//EGDM 9.3//82.5//7.2 | MMA | 8,000 |
| STAR | MMA/TRIS//EGDM 24.3/68.6//7.1 | RANDOM | 10,300 |
| STAR | MMA/TRIS//EGDM 42.9/43.4//13.7 | RANDOM | 10,300 |
| STAR | MMA/TRIS//EGDM 60.0/26.4//13.6 | RANDOM | 10,300 |
| STAR | MMA/TRIS//EGDM 68.4/18.2//13.4 | RANDOM | 10,300 |

MMA = methyl methacrylate
TRIS = 3-tris(trimethylsiloxy)silanepropyl methacrylate
EGDM = ethyleneglycol dimethacrylate
PENTA = 3-methacryloxypropylpentamethyldisiloxane
*i.e. in the form of an alpha-methylstyrene organo group containing a carbon-carbon double bond, the group is linked to the end of the arm by a urethane linkage formed by the reaction of an isocyanate group and a hydroxy group.

Preferred star polymers include:

| Type of Polymer | Composition | Block Next to Double Bond | Molecular Weight Of Arm Mn |
|---|---|---|---|
| STAR | TRIS//MMA//EGDM 36.6//55.2//8.2 | TRIS | 10,000 |
| STAR | TRIS//MMA//EGDM 22.9//70.0//7.1 | TRIS | 10,000 |
| STAR | TRIS//MMA//EGDM 9.7//83.0//7.3 | TRIS | 9,200 |
| STAR | PENTA//MMA//EGDM 38.8//56.8//4.4 | PENTA | 9,900 |

The macromonomers and star polymers preferably contain polymerizable double bonds to facilitate polymerization with the monomers of the polymer matrix to synthesize copolymers of the present invention. The polymerizable double bond that is attached to the ends of the macromonomer or to the arms of the stars may be a methacryloxy, an acryloxy, a styrenic, an alpha methyl styrenic, an allylic, a vinylic, or other olefinic groups. It can be attached to the macromonomer or star polymer by reacting a functional group on the polymer with compounds that can attach a polymerizable double bond to the polymer. Such compounds include, for example, any molecule that has a second functional group that can react with the first functional group in addition to a polymerizable double bond.

Examples of functional groups that can be present on the macromonomer or star polymer include hydroxy, carboxylic acid, epoxy, and aziridine. The functional group may be present as such or may be present in blocked form which requires the removal of the blocking group before attachment of the polymerizable double bond. The functional group may be attached to the polymer through either a functional initiator or a functional terminal monomer. Examples of the second functional group that can be reacted with the first functional group include epoxy, hydroxy, acid, aziridine, isocyanate, acid chloride, anhydride, and ester, among others.

Blocked hydroxyl initiators which can be used in the macromonomers and star polymers of the present invention include 1-(2-trimethylsiloxyethoxy)-1-trimethylsiloxy-2-methyl propene and 1-[2-(methoxymethoxy)ethoxyl]-1-trimethylsiloxy-2-methylpropene. Blocked hydroxyl monomers which can be used include 2-(trimethylsiloxy)ethyl methacrylate, 2-(trimethylsiloxy)propyl methacrylate, and 3,3-dimethoxypropyl acrylate. Blocked hydroxyl monomers which can be used include 2-(trimethylsiloxy)ethyl methacrylate, 2-(trimethylsiloxy)propyl methacrylate and 3,3-dimethoxypropyl acrylate. When the polymerization is completed, the blocking group is removed to give a hydroxy functional polymer. Examples of hydroxy functional monomers include: 2-hydroxyethyl acrylate, 2-hydroxyethyl methacrylate, hydroxypropyl acrylate, and hydroxypropyl methacrylate.

Upon deblocking, the hydroxy group is then reacted with compounds that can attach a polymerizable double bond to the polymer. Examples of these include: 2-isocyanatoethyl methacrylate, methacryloyl chloride, acryloyl chloride, alpha-Methylstyrene isocyanate, acrylic acid, methacrylic acid, anhydrides of acrlic and methacrylic acid, maleic anhydride, and esters of acrylic and methacrylic acids in transesterifcation reactions.

Blocked acid initiators which can be used include 1,1-bis(trimethylsiloxy)-2-methyl propene and 1,1-bis(trimethylsiloxy)propene. Blocked acid monomers which can be used include trimethylsiloxy methacrylate and 1-butoxyethyl methacrylate. When the polymerization is completed, the blocking group is removed to give an acid functional polymer. Acid monomers which can be used include acrylic acid, itaconic acid, and methacrylic acid.

The acid group is then reacted with compounds that contain a polyerizable double bond and can be attached to the polymer. Examples of these include: glycidyl acrylate and methacrylate, aziridinyl acrylate and methacrylate, and hydroxy esters of acrylic and methacrylic acid.

The preformed silicone-containing acrylic copolymers, i.e., macromonomers and star polymers of the present invention generally comprise about 10.0% to about 98% by weight of the composition of the present invention, preferably about 15% to about 60% by weight of said material, and most preferably about 20% to about 45% by weight of said composition.

Many of the current, conventional gas permeable lenses are slightly crosslinked copolymers of MMA and TRIS. The ratio of the two monomers is adjusted to optimize a balance of properties. As the level of TRIS monomer is increased, the permeability of the contact lens increases, but the hardness and flex resistance decreases. The amount of TRIS used is limited by the minimum hardness that is acceptable for manufacturability. Typically, a minimum Shore D hardness of 70 is needed for good manufacturing of lenses unless the lens is molded instead of machined. The necessity of having a Shore D hardness of 70 results in a maximum oxygen permeability (DK) of about 40.

Contact lenses made from the contact lens polymers of the present invention exhibit surprisingly high oxygen permeability in combination with enhanced machineability and durability. In certain embodiments of the present invention contact lenses having Dk's above about 50 and as high as about 135, in combination with a Shore D hardness of at least about 70, have been made. While not being bound by theory, it is believed that the addition of the star polymer or macromonomer forms a second phase in the lens in addition to that of the matrix. The matrix of the lens generally is a high silicone content resin or copolymer that will have very high oxygen permeability. The second phase generally provides the characteristics of good machineability and durability without reducing the oxygen flow.

At a constant weight of permeable silicone acrylate, such as TRIS used in the lens formulation, the addition of hard star or macromonomer allows the amount of MMA or other hard monomer used in the matrix to be reduced. This results in an increase in the ratio of permeable monomer to hard monomer in the matrix. Since the amount of permeable monomer in the matrix is higher, the permeability of the lens is higher. However there generally is no sacrifice in hardness since the hard star or macromonomer improves the hardness/toughness. The presence of the star or macromonomer does not adversely affect permeability.

Hard polymers, such as PMMA, are not very soluble in highly permeable monomers, such as TRIS. It has been found that if the polymer is made into a block polymer of silicone monomer and MMA, then it can be "dissolved" or dispersed into the free TRIS. With this process, solutions of hard polymers have been made and copolymerized to make lenses with surprising properties including substantially enhanced oxygen permeability, durability, optical clarity and machining. While the use of the block polymer structure in the macromonomers and star polymers improves the ease of making the polymer solutions, the use of this block structure is not absolutely necessary for the invention. Random copolymers, finely dispersed hard polymers, and soluble hard polymer/permeable monomer mixtures may also be used.

In the method of making copolymers according to the present invention, a novel feature of the present invention relates to the bulk copolymerization of macromonomers and star polymers in combination with monomers for example, silicone acrylates, esters of acrylic and methacrylic acid, fluoro esters, wetting monomers and crosslinking monomers. In this method of the present invention, the individual monomers and the macromonomer or star polymer are mixed together to produce a liquid mixture, which is subsequently placed in a polymerization tube or a mold and then polymerized. The copolymer thus produced may be extruded, pressed or molded into rods, sheets or other convenient shapes which may be machined to the desired shape using conventional equipment and procedures for producing contact lenses readily known to those of skill in the art. Polymerization is produced by a thermal process, by use of ultraviolet light or gamma radiation or by a combination of these methods. In certain cases in which the amount of macromonomer and/or star polymer is very high, i.e. above about 85% by weight of the copolymer and approaching 100% by weight of the copolymer, it may be necessary to first dissolve the macromonomer and/or star polymer in an appropriate organic solvent, for example, a chlorinated hydrocarbon such as methylene chloride, before polymerization. Where such a high weight percentage of macromonomer and/or star polymer is used the matrix will generally include high weight percentages of wetting monomer. In general, the monomers that are used for the matrix of the copolymer dissolve the macromonomer and star polymer to produce a viscous solution which may then be polymerized. There is generally no need to add an organic solvent to the mixture except where the amount of macromonomer or star polymer is included at such a high weight percentage that the amount of comonomer is insufficient to dissolve the macromonomer or star polymer.

To synthesize the copolymers according to the present invention, the individual monomers are first mixed together to produce a viscous solution of monomer. Thereafter, the selected macromonomer or star polymer is then mixed with the viscous solution of monomer and is then agitated with a mechanical stirrer or on an industrial tumbler (U.S. Stoneware Corp. Mahwah, N.J. U.S.A.) for a few hours to about 5 days, usually for about 3 to 5 days at low speed, e.g., about 20 rpm to about 320 rpm, preferably about 30 to 40 rpm, until the mixture is a viscous solution. This process of adding the macromonomer or star polymer after the monomers are in solution reduces the difficulty of making solutions with these preformed polymers. Thereafter, the mixture is poured into button molds, tubes, or in a cast base curve radius type mold. The mixture is polymerized in the presence of at least one free radical initiator which comprises about 0.05% to about 2.0%, preferably no more than about 0.5% by weight of the mixture. In certain cases polymerization may be effectuated by the use of gamma radiation. Polymerization initiators for use in the present invention are those which are commonly used in polymerizing ethylenically unsaturated compounds. Representative free radical polymerization initiators include peroxide containing compounds including acetyl peroxide, benzoyl peroxide, lauroyl peroxide, decanoyl peroxide, caprylyl peroxide, tertiary-butyl peroxypivalate, diisopropyl peroxycarbonate, tertiary-butyl peroctoate and alpha, alpha'-azobisisobutyronitrile. Preferred initiators for use in the present invention include 2,2'-Azobis[2,4-dimethylvaleronitrile] (Vazo 52). In certain embodiments of the present invention in which VIN is used as the silicone acrylate, a combination of Vazo 52 and Tertiary-butyl-peroxybenzoate (BEPOB) is preferred for initiation of polymerization.

Conventional polymerization techniques may be used to produce the copolymers of the present invention. Two methods of polymerization are preferred. The first method utilizes heat; the second utilizes ultraviolet light or ultraviolet light and heat.

In the heat polymerization method, the solutions containing monomer mixture and macromonomer and/or star polymer are placed in a polymerization tube, capped and heated in a water bath at a temperature ranging from about 25° C. to about 60° C., preferably about 30° C. for a period generally ranging from about 10 to about 28 hours. After this first heating step, the polymer mixture is then heated in an oven at 45° C. for a period of about 4 hours and then the temperature is raised to over 100° C. for a period of about 24 hours to about 48 hours. Thereafter, the tubes are cooled to room temperature and the rods are punched out. The rods are ground to a half inch diameter and cut into buttons. These buttons are then cut and lathed into contact lenses using standard methods known by those of ordinary skill in the art.

In the polymerization method that utilizes ultraviolet light or ultraviolet light and heat, after the solution containing monomers, macromonomer or star polymer and polymerization initiator is poured into button molds, the molds are placed in a UV box. Nitrogen and vaccuum are generally applied alternatively. Irradiation is applied for a period ranging from about 30 minutes to about 90 minutes under nitrogen atmosphere. The molds are then removed and heated for two hours at about 90° C., then the temperature is raised to about 110° C. for a period ranging from about 16 to about 24 hours, generally about 20 hours. Buttons are then punched out of the molds and faced.

The copolymers and contact lenses of the present invention exhibit enhanced characteristics of at least one of the characteristics of oxygen permeability, machining and durability. Quite surprisingly, for the same quantity of silicone acrylate, the contact lenses of the present invention exhibit substantially enhanced oxygen permeability, hardness, durability and machining characteristics compared to contact lenses comprised of the same monomers in the same weight percentages which have been synthesized by a random polymerization process. In the examples that follow, contact lenses of the present invention were compared with lenses synthesized by a conventional random polymerization process and evidenced substantially superior characteristics.

Contact lenses prepared from the copolymers according to the present invention generally have a refractive index ranging from about 1.35 to about 1.50, preferably about 1.40. Contact lenses of the present invention preferably exhibit a Dk in excess of about 50 and a Shore D hardness in excess of about 70.

After preparation of the copolymers as described hereinabove, they are fabricated into rigid gas permeable contact lenses and the resultant lenses are then fitted to the eye of a patient suffering from visual deficiency in accordance with known prior art techniques for fabricating or fitting rigid gas permeable contact lenses.

The following examples are provided to illustrate the present invention and should not be construed to limit the scope of the present invention in any way.

EXAMPLES

Comparison I

This describes the preparation of a conventional contact lens made by a random copolymerization of monomers.

Formulation:

The following materials were mixed together: 51.8 gm of methyl methacrylate MMA, 36.0 gm of TRIS (trimethylsiloxy) 3-methacryloxypropylsilane (TRIS), 7.0 gm of N-vinyl pyrrolidone (NVP), 5.0 gm of tetraethyleneglycol dimethacrylate (TEGMA), and 0.2 gm of Vazo-52. The solution was poured in button molds, tubes, or in a cast base curve radius type molds.

Methods of Polymerization:

Method 1: Thermal polymerization. The mixture was heated at 30° C. for 44 hours, then 4 hours at 45° C., finally 24 hours at 110° C.

Lens Manufacturing:

A lathe was used to cut lenses using standard production procedures.

Results:

The above formulation made a good lens, that had a Shore D hardness of 75 and a DK of 17.0.

Hardness measurements:

A Shore D hardness tester was used to determine the hardness of buttons made either from a button mold or cut from a tube.

Oxygen Permeability:

Oxygen permeabilities are determined using standard techniques, for example, as in ASTM-D-1434 as described, for example, in U.S. Pat. No. 3,808,178, at Column 4, lines 36-44. A preferred method for determining oxygen permeability in the following examples is described by Irving Fatt in *International Contact Lens Clinic (I.C.L.C.)*, 11, 175 (1984) and Fatt, et al., in *International Contact Lens Clinic (I.C.L.C.)*, 9, 119 (1982). The contact lenses materials tested were about 0.2 mm thick. The values given are the diffusion constants:

$$Dk = \times 10^{11} \frac{cm^3 cm}{s\, cm^2 mm\, Hg}$$

Swelling Measurements:

A contact lens button was weighed and soaked in heptane or ethyl alcohol for 18 hours, the containers were placed in a water bath at room temperature. The buttons were taken out and wiped dry with a paper towel, the difference in weight is recorded and the percentage is calculated based on the original weight of the button.

COMPARISONS

The following presents a series of lenses made by copolymerization of MMA and TRIS.

The N-vinyl pyrrolidone (NVP) was added to improve the wetting characteristics of the finished lens. Other exemplary wetting monomers include methacrylic acid, acrylic acid, hydroxyethyl methacrylate, and glyceryl methacrylate. It is thought that the use of a wetting monomer as substitute for a non-permeable monomer does not affect either the permeability or hardness of the lenses.

The tetraethyleneglycol dimethacrylate (TEGMA) was added to crosslink the lens and improve the swell resistance of the finished lens. Other exemplary crosslinking monomers include ethyleneglycol dimethacrylate, diethyleneglycol dimethacrylate, and trimethylolpropane trimethacrylate TMPTMA. It is believed that the use of a crosslinking monomer at less than about 8% does not affect permeability.

Other monomers, such as hexafluorobutyl methacrylate, styrene, t-butylstyrene, etc. can be used to improve some properties, including deposit resistance. These monomers are generally used at less than about 10% of the total composition.

| Comparison Runs | Formulation | | | | Properties | |
|---|---|---|---|---|---|---|
| | TRIS | MMA | NVP | TEGMA | Vazo-52 | DK | Hardness |
| 1 | 36 | 51.8 | 7 | 5 | 0.2 | 17 | 75 |
| 2 | 48 | 39.8 | 7 | 5 | 0.2 | 35 | 70 |
| 3 | 53 | 34.8 | 7 | 5 | 0.2 | 34.5 | 64 |
| 4 | 55 | 32.8 | 7 | 5 | 0.2 | 36.9 | 60.5 |
| 5 | 60 | 27.8 | 7 | 5 | 0.2 | 47.3 | 58 |
| 6 | 66 | 21.8 | 7 | 5 | 0.2 | 70.0 | 54.0 |
| 7 | 70 | 17.8 | 7 | 5 | 0.2 | | too soft |

The above table shows the results that are obtained with conventional random copolymerization of a hard monomer MMA and a permeable monomer TRIS. Lenses made with the formulations of Comparisons 3, 4, 5, 6, and 7 were considered to be of inferior commercial quality and essentially unusable. They were too soft to properly cut and lathe, were easily scratched, and were solvent sensitive, i.e they had over 15% solvent swelling.

Figure 1A:
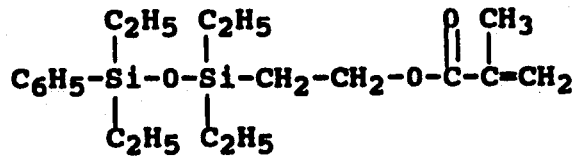
FIGS. 1A, 1B and 1C set forth the names and chemical structures of numerous exemplary silicone acrylates that may be used in the copolymers according to the present invention.
Figure 1A:
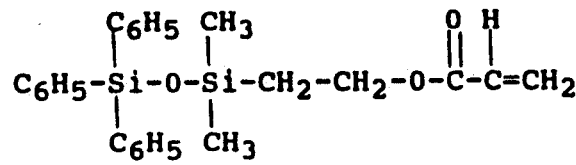
Figure 1A:
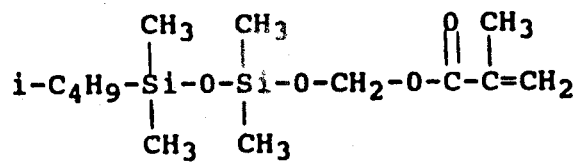
Figure 1A:
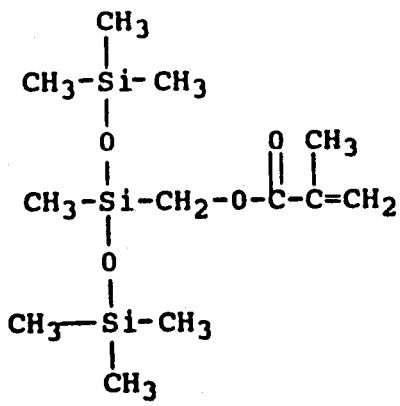
Figure 1A:
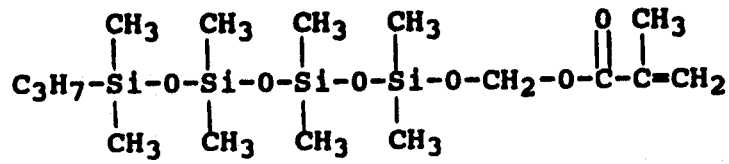
Figure 1B:
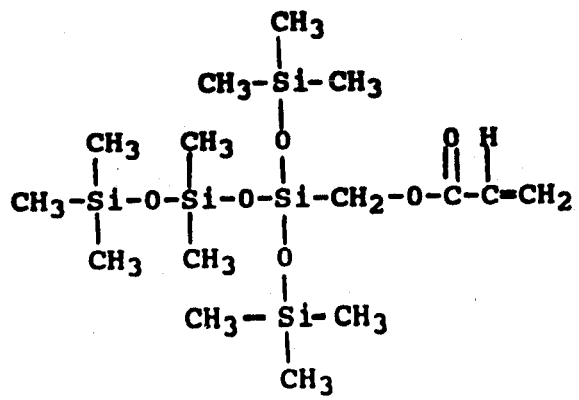
Figure 1B:
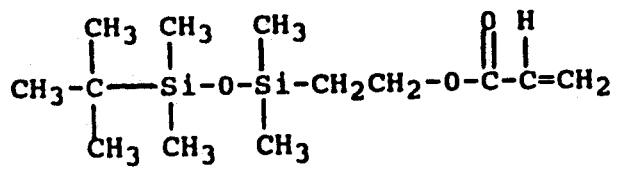
Figure 1B:
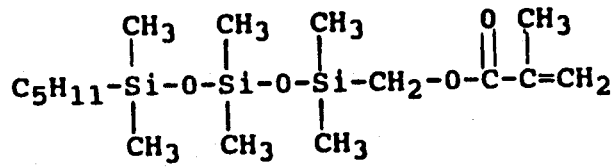
Figure 1B:
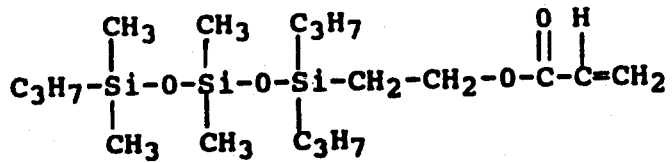
Figure 1B:
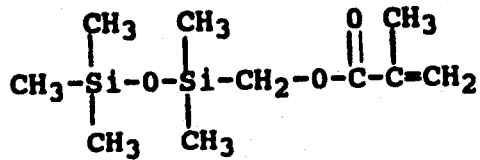
Figure 1C:
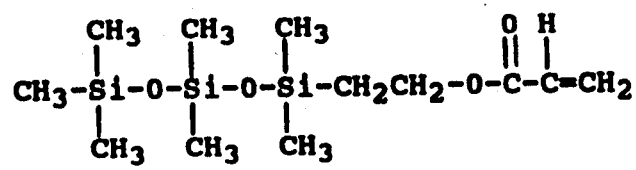
Figure 1C:
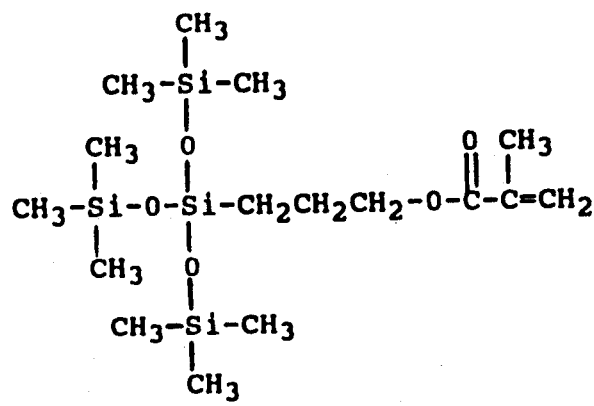
Figure 1C:
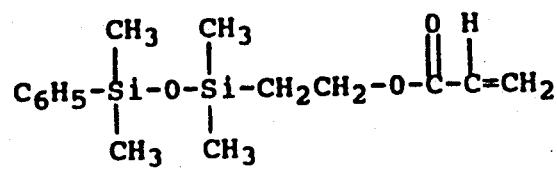
Figure 2:
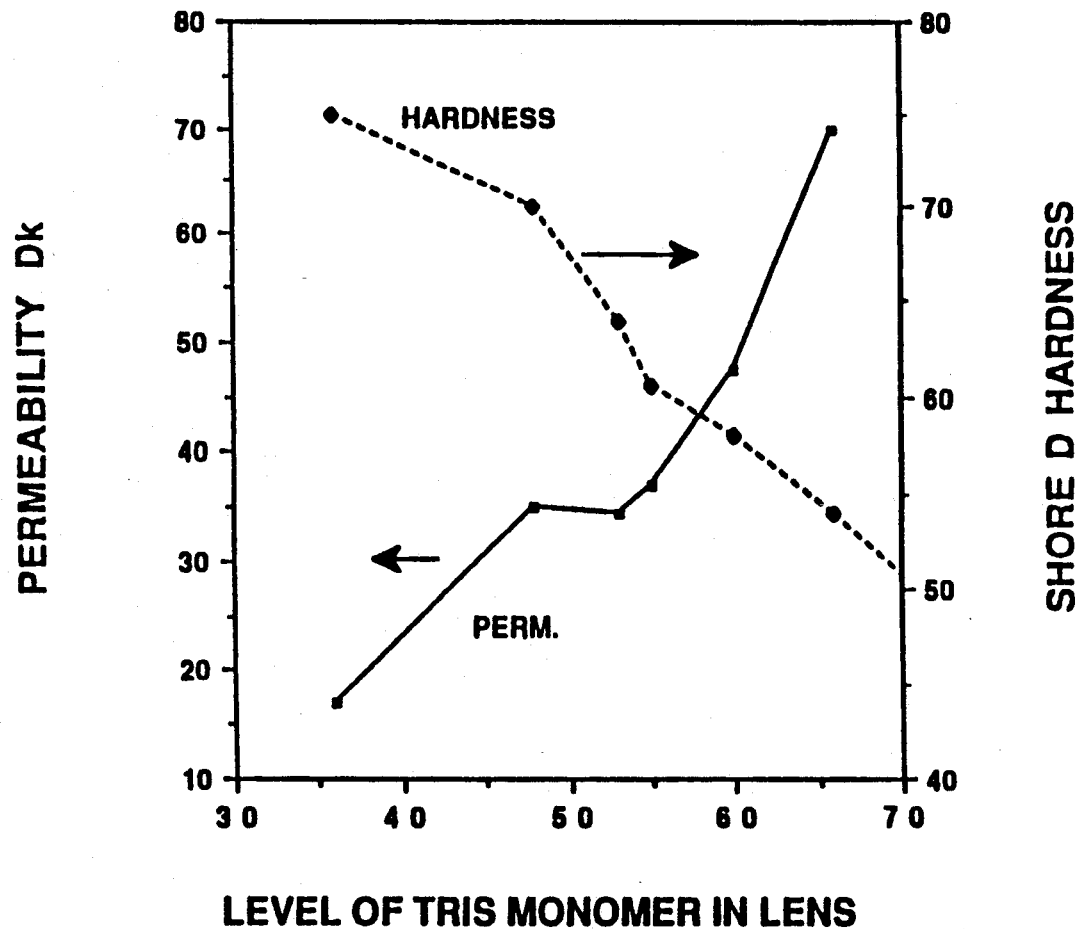

The results from Comparisons 1 to 7 are standard for lenses made from a random copolymerization of hard monomer such as MMA and a permeable monomer such as TRIS. These results, as shown in FIG. 2, indicate that as the level of permeable monomer is increased, the oxygen permeability is increased, but the hardness of the lens decreases. The balance of permeability versus hardness for conventional lenses made from copolymers is shown in FIG. 3. For lenses made from copolymers of monomers such as MMA and TRIS, increases in permeability leads to decreases in hardness.

EXAMPLES 1-17

In the examples that follow, the compositions are expressed in terms of the weight ratios. The following describe the composition and synthesis of star polymers that have arms that are either diblocks (methyl methacrylate (MMA) and silicone), copolymers, or homopolymers, that have cores of ethyleneglycol dimethacrylate, and have a polymerizable double bond attached to the ends of the arms. The examples also describe the use of macromonomers that are either diblocks, copolymers, or homopolymers and have a polymerizable double bond attached to an end of the chain.

EXAMPLE 1

TRIS//MMA//EGDM 36.6//55.2//8.2 STAR

This reaction sequence describes the preparation of a star polymer that has arms composed of a block of 3-methacryloxypropyltris(trimethylsiloxy)silane and a block of MMA. The core is ethyleneglycol dimethacrylate. There is a double bond located at the ends of the arms next to the TRIS block.

A 1 liter flask was equipped with a mechanical stirrer, thermometer, $N_2$ inlet, drying tube outlet and addition funnels. 3-Methacryloxypropyltris(trimethylsiloxy)silane TRIS, 60.54 gm; THF, 38.38; p-xylene, 3.01 gm; tetrabutylammonium m-chlorobenzoate, 300 ul of a 1.0M solution; and bis(dimethylamino)methylsilane, 400 ul, were charged to the pot. Initiator, 1-(2-trimethylsiloxy)ethoxy-1-trimethylsiloxy-2-methylpropene, 4.19 gm was injected and the TRIS block was polymerized. Feed I [THF, 5.62 gm; tetrabutylammonium m-chlorobenzoate, 300 ul of a 1.0M solution] was then started and added over 60 minutes. Feed II [methyl methacrylate, 91.30 gm; THF, 146.88 gm] was started and added over 15 minutes. Feed III [ethyleneglycol dimethacrylate, 13.56 gm] was started at 30 minutes after the end of Feed II and added over 10 minutes. At 100 minutes the reaction was quenched with methanol, 3.56 gm; $H_2O$, 1.98 gm; dichloroacetic acid, 7 ul. It was refluxed for 3 hours. Solvent, 279.8 gm, was distilled off while 378.12 gm of toluene was added. The contents of the flask were distilled until the vapor temperature equaled approximately 108° C. Then dibutyltin dilaurate, 55 ul; and alpha-Methylstyrene isocyanate (TMI from Am. Cyanamid), 5.57 gm, were added and refluxed for 3 hours. This puts a reactive double bond at the end of each arm of the star. Methanol, 0.62 gm, was added and refluxed 30 minutes. The polymer solution was then poured into methanol. The solid star polymer precipitated out and was dried.

This made a star polymer of TRIS//MMA 40//60 arms with a polymerizable double bond at the end of the arms. The arms have a Mn of about 10,000. The star has a Mw of about 240,000.

EXAMPLE 2

Star Polymer Without a Polymerizable Double Bond

The star polymer of example 1 was prepared, except that the product obtained from Feed III was quenched by adding methanol, H$_2$O and dibutyltin dilaurate, followed by reflux. After a three hour reflux, the star polymer was evaporated to dryness, poured into methanol, precipitated, collected and dried. Further conversion of the star polymer with alpha-methylstyrene isocyanate was not performed to avoid the formation of a reactive double bond.

EXAMPLE 3

TRIS//MMA//EGDM 22.9 // 70.0 // 7.1 STAR

This describes the preparation of a star polymer that has arms composed of a block of TRIS [3-methacryloxypropyltris(trimethylsiloxy)silane] and a block of MMA. The core is ethyleneglycol dimethacrylate. There is a double bond located at the ends of the arms next to the TRIS block.

A 1 liter flask was equipped with a mechanical stirrer, thermometer, N2 inlet, drying tube outlet and addition funnels. TRIS(trimethylsiloxy)-3-methacryloxypropylsilane, 76.79 gm; THF, 18.74; p-xylene, 4.66 gm; tetrabutylammonium m-chlorobenzoate, 500 ul of a 1.0M solution; and bis(dimethylamino)methylsilane, 500 ul, were charged to the pot. Initiator, 1-(2-trimethylsiloxy)ethoxy-1-trimethylsiloxy-2-methylpropene, 8.43 gm was injected and the TRIS block was polymerized. Feed I [THF, 5.62 gm; tetrabutylammonium m-chlorobenzoate, 300 ul of a 1.0M solution] was then started and added over 60 minutes. Feed II [methyl methacrylate, 234 3 gm; THF, 391.2 gm, and bis(dimethylamino)methylsilane, 500 ul] was started and added over 15 minutes. Feed III [ethyleneglycol dimethacrylate, 24.02 gm] was started at 30 minutes after the end of Feed II and added over 10 minutes. At 100 minutes the reaction was quenched with methanol, 5.92 gm; H2O, 2.47 gm; dichloroacetic acid, 15 ul. It was refluxed for 3 hours. Solvent, 699.8 gm, was distilled off while 888.12 gm of toluene was added. The contents of the flask were distilled until the vapor temperature equaled approximately 108° C. Then dibutyltin dilaurate, 155 ul; and alpha-Methylstyrene isocyanate (TMI from Am. Cyanamid), 7.61 gm, were added and refluxed for 3 hours. This puts a reactive double bond at the end of each arm of the star. Methanol, 0.62 gm, was added and refluxed 30 minutes. Butanol, 5.1 gm, was added and refluxed 30 minutes. The polymer solution was then poured into methanol. The solid star polymer precipitated out and was dried.

This reaction sequence produced a star polymer of TRIS//MMA 25//75 arms with a polymerizable double bond at the end of the arms. The arms have a Mn of about 10,000. The star has a Mw of about 280,000.

EXAMPLE 4

TRIS//MMA 40//60 MACROMONOMER

This describes the preparation of a macromonomer composed of a block of 3-methacryloxypropyltris(-trimethylsiloxy)silane and a block of MMA methyl methacrylate. The double bond is located next to the TRIS block.

A 2 liter flask is equipped with a mechanical stirrer, thermometer, N2 inlet, drying tube outlet and addition funnels. TRIS(trimethylsiloxy)-3-methacryloxypropylsilane (TRIS), 120.82 gm; THF, 27.26 gm; p-xylene, 2.57 gm; tetrabutylammonium m-chlorobenzoate, 300 ul of a 1.0M solution; and bis(dimethylamino)methylsilane, 500 ul were charged to the pot. Initiator 1-(2-trimethylsiloxy)ethoxy-1-trimethylsiloxy-2-methylpropene, 13.79 gm was injected and the TRIS block was polymerized. Feed I [methyl methacrylate, 183 6 gm; THF, 157.7 gm; bis(dimethylamino)methylsilane 500 ul] was started and added over 20 minutes. At 90 minutes the reaction was quenched with methanol; 7.80 gm; H2O, 4.59 gm; dichloroacetic acid, 20 ul. It was refluxed for 3 hours. Then 215 gm of solvent was distilled off while 350 gm of toluene was added. The contents of the flask were distilled until the vapor temperature equaled approximately 108° C. alpha-Methylstyrene isocyanate (TMI from Am. Cyanamid), 12.1 gm and dibutyltin dilaurate, 150 ul were added and refluxed for 3 hours. This puts a reactive double bond at the end of each polymer chain. Methanol, 0.62 gm, was added and refluxed 30 minutes. Butanol, 4.68 gm was added and refluxed 1 hour. The polymer solution was then poured into methanol. The solid star polymer precipitated out and was dried.

This made a macromonomer of TRIS//MMA 40//60 with the polymerizable double bond next to the TRIS block. The polymer has a Mn of about 10,600.

EXAMPLE 5

Macromonomer Without a Reactive Double Bond

The macromonomer of example 4 was prepared without a reactive double bond at the end of the polymer by quenching the reaction after Feed I with methanol, H$_2$O and dichloracetic acid followed by a 3 hour reflux. After the three hour reflux, the macromonomer was evaporated to dryness, poured into methanol, precipitated, collected and dried. alpha-Methylstyrene isocyanate was not added to the reaction to avoid the formation of the reactive double bond.

EXAMPLES 6 to 18

The following show the advantages obtained by using star and macromonomer polymers in a contact lens formulation. All of the lenses made in these formulations were hard, easy to cut and lathe, resistant to scratches, and had less than 15% solvent swell. The lenses made from the star polymer and macromonomer of examples 2 and 5 evidenced slightly less favorable machining characteristics than lenses made from the star polymer and macromonomers of examples 1, 3 and 4.

Preparation Procedure for Lenses Made with Stars or Macromonomers

I. Mixing Procedure

All liquid ingredients were weighed and mixed in screw-on-cap bottle shaken and stirred for a while. The star or macromonomer (from Examples 1 to 5) was weighed and added to the liquid ingredients in small portions. In order to disperse the powder in the bulk of the mixture, after each addition the mixture was stirred using a magnetic stirrer, the bottle then capped and sealed properly, tumbled on a roller mill until the solution was clear and homogeneous (from several hours to several days). The initiator and the color were added and tumbled for half an hour, then poured in molds or tubes.

II. Polymerization Procedure:

Thermal Polymerization

Solutions were poured in nitrogen flushed aluminum tubes, capped and put in a water bath for 44 hours at 30° C. The solutions were then heated in an oven for 4 hours at 45° C. and finally the temperature was raised to 110° C. for 24 hours. Sometimes an extra 24 hours at 130° C. was used. The tubes were cooled to room temperature and the rods were punched out. The rods were ground to the half inch diameter and cut to buttons. These buttons were then cut and lathed into lenses. Dk was determined on 0.2 mm thick lenses using standard procedures well known in the art.

The Ultraviolet Method

After the solution was prepared, it was poured in button molds and placed in a UV box. Nitrogen and vacuum was applied alternatively. Irradiation was applied for 45 minutes under nitrogen atmosphere. The molds were then removed and heated for two hours at 90° C., then the temperature was raised to 110° C. for 20 hours. Buttons were punched out of the molds and faced.

III. Lens Manufacturing:

A lathe cut lenses using standard production procedures.

EXAMPLES 6 TO 9

The following examples 6 to 9 use the star that was prepared in Example 1. Weight percentages of the different components are set forth below.

| | Formulation | | | | | | | Properties | |
|---|---|---|---|---|---|---|---|---|---|
| Exam. | TRIS | MMA | STAR | NVP | MAA | TMPTMA | Vazo-52 | DK | Hardness |
| 6 | 35 | 35.3 | 15 | 5 | 5 | 4.5 | 0.2 | 25 | 83 |
| 7 | 50 | 22.8 | 20 | 7 | — | — | 0.2 | 47.2 | |
| 8* | 45.5 | 15.7 | 24.3 | — | — | 5 | 0.2 | 58 | 76.2 |
| 9 | 53.7 | 7.5 | 27.5 | 6.5 | — | 4.6 | 0.2 | 91.0 | 78 |

*Example 8 also used 6.0% hexafluorobutyl methacrylate and 3.5% glyceryl methacrylate in its formulation.

EXAMPLE 10

This example uses the star that was prepared in Example 3.

| | Formulation | | | | | | Properties | |
|---|---|---|---|---|---|---|---|---|
| Exam. | TRIS | MMA | STAR | MAA | TEGMA | Vazo-52 | DK | Hardness |
| 10 | 29 | 15.8 | 45 | 5 | 5 | 0.2 | 61 | 82 |

EXAMPLES 11 and 12

These examples use the macromonomer that was prepared in Example 4.

| | Formulation | | | | | | Properties | |
|---|---|---|---|---|---|---|---|---|
| Exam. | TRIS | MMA | MACRO | MAA | TEGMA | Vazo-52 | DK | Hardness |
| 11* | 41.8 | — | 35 | 5 | 5 | 0.2 | | |
| 12 | 42 | 12.8 | 35 | 5 | 5 | 0.2 | 68 | 82 |

*Example 11 also used 13.0% hexafluorobutyl methacrylate in its formulation.

EXAMPLES 13 TO 18

These examples use the star that was prepared in Example 1 or the star or macromonomer which do not contain reactive double bonds as prepared in Examples 2 or 5.

| | Formulation | | | | | | | | Properties | |
|---|---|---|---|---|---|---|---|---|---|---|
| Exam. | TRIS | VIN.* | MMA | STAR | NVP | MAA | TMPTMA | Vazo-52 | DK | Hardness |
| 13 | 27.4 | 27.4 | 5.5 | 25 | 4 | 5 | 5.5 | 0.2 | 67 | 79 |
| 14 | 34.8 | 20 | 5.5 | 25 | 4 | 5 | 5.5 | 0.2 | 69 | 80 |
| 15** | — | 48.8 | 5 | 25 | 5 | 5 | 5 | 0.2 | 52 | 83 |
| 16 | 55.0 | — | 5.5 | 27.5 | 3 | 4 | 5 | 0.2*** | 134 | 78.2 |
| 17 | 35 | 20 | — | 25+ | 9 | 5.5 | 5.5 | 0.2*** | — | 78 |
| 18 | 35 | 20 | — | 25++ | 9 | 5.5 | 5.5 | 0.2*** | — | 66 |

*VIN = 3-[3-methacryloxypropyl-1,3,3-tris(trimethylsiloxy)-1-methyl-1-vinyldisiloxane]
**Example 15 also used 6.0% hexafluorobutyl methacrylate in its formulation.
***Example 16, 17 and 18 also used 0.3% Tertiarybutylperoxybenzoate (BEPOB) as initiator.
+Example 17 utilized the star polymer obtained in Example 2 which did not contain reactive double bonds. The contact lens obtained from copolymer containing this star polymer dispersed throughout the matrix evidenced diminished machining characteristics compared to copolymer containing star polymer obtained in Example 1.
++Example 18 utilized the macromonomer obtained in Example 5 which did not contain reactive double bonds. The contact lens obtained from copolymer containing this macromonomer dispersed throughout the matrix evidenced diminished machining characteristics compared to copolymer containing macromonomer obtained in Example 4.

Examples 6 to 18 show the advantages of stars and macromonomers in contact lens formulations. The hardness and oxygen permeability of lenses made with these materials are generally significantly greater than those obtained with random copolymers as listed in Comparisons 1 to 7. The difference in permeability versus the level of TRIS monomer used can be seen in FIG. 4. The data from Examples 6 to 18 show that lenses that contain stars or macromonomers are significantly more permeable than those made from conventional, random formulations made with the same level of total TRIS monomer.

The use of these stars and macromonomers does not adversely affect the hardness values of the lenses. This can be seen in the data and in FIG. 5 which is a plot of permeability of lenses versus their hardnesses. Lenses made with stars or macromonomers have a superior hardness/permeability balance. They are clearly harder and more permeable than conventional lenses.

This invention has been described in terms of specific embodiments set forth in detail herein, but it should be understood that these are by way of illustration and the invention is not necessarily limited thereto. Modifications and variations will be apparent from the disclosure and may be resorted to without departing from the spirit of the inventions those of skill in the art will readily understand. Accordingly, such variations and modifications are considered to be within the purview and scope of the invention and the following claims.

What is claimed is:

1. A composition comprising about 10% to about 98% by weight of at least one preformed silicone-containing acrylic copolymer and about 2% to about 90% by weight of a matrix formed from the random polymerization of a mixture of monomers, said monomers being selected from the group consisting of silicone acrylates, esters of alpha, beta-unsaturated acids, wetting monomers and mixtures thereof, said preformed silicone-containing acrylic copolymer being dispersed or copolymerized through said matrix of said composition after said polymerization.

2. A composition according to claim 1 exhibiting substantially enhanced characteristics of at least one of the characteristic group of oxygen permeability, hardness and machineability, said preformed silicone-containing acrylic copolymer being copolymerized throughout said matrix of said composition.

3. The composition according to claim 2 wherein said silicone-containing acrylic copolymer comprises about 10% to about 90% by weight of a silicone acrylate.

4. The composition according to claim 2 wherein said silicone acrylates are selected from the group consisting of TRIS(trimethylsiloxy)-3-methacryloxypropylsilane, 3-[3-methacryloxypropyl-1,3,3-tris(trimethylsiloxy)-1-methyl-1-vinyldisiloxane] and mixtures thereof.

5. The composition according to claim 4 wherein said silicone acrylates comprise TRIS(TRIS(trimethylsiloxy)-3-methacryloxypropylsilane.

6. The composition according to claim 2 wherein said silicone-containing acrylic copolymer comprises an ester of an alpha, beta unsaturated acid in an amount ranging from about 90% to 0% by weight of said copolymer.

7. The composition according to claim 6 wherein said ester is methyl methacrylate.

8. The composition according to claim 2 wherein said mixture of monomers further comprises a crosslinking monomer in an amount ranging from about 0.5% to about 12.0% by weight of said matrix.

9. The composition according to claim 8 wherein said crosslinking monomer comprises about 2.0% to about 10% by weight of said composition.

10. The composition according to claim 8 wherein said crosslinking monomer is selected from the group consisting of ethylene dimethacrylate, tetraethyleneglycol dimethacrylate ((TEGMA)), ethylene glycol dimethacrylate ((EGMA)), trimethylolpropanetrimethacrylate ((TMPTMA)) and triethyleneglycol dimethacrylate.

11. The composition according to claim 10 wherein said wetting monomer comprises about 0.5% to about 80% by weight of said composition.

12. The composition according to claim 11 wherein said wetting monomer is selected from the group consisting of methacrylic acid, vinyl pyrrolidone, glycerolmethacrylate and mixtures thereof in an amount ranging from about 5% to about 20% by weight.

13. The composition according to claim 2 further comprising about 2% to about 80% by weight of a flouro acrylate.

14. The composition according to claim 13 wherein said fluoro acrylate is 2,2,3,4,4,4-hexafluorobutylmethacrylate.

15. The composition according to claim 12 further comprising about 2% to about 80% by weight of a fluoro acrylate.

16. The composition according to claim 2 wherein said preformed silicone-containing acrylic copolymer comprises about 15% to about 60% by weight of said composition.

17. The composition according to claim 2 wherein said preformed silicone-containing acrylic copolymer is a macromonomer comprising a random or block polymer derived from a mixture of monomers comprising:

a) about 0% to about 90% by weight of one or more monomers of the structure:

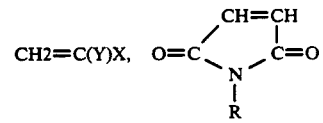

and mixtures thereof wherein: X is —CN, —CN=CHC(O)X' or —C(O)X'; Y is —H, —CH₃, —CN or —CO₂R, provided, however, when X is —CH=CHC(O)X', Y is —H or —CH₃; X' is —O-Si(R)₃, —R, —OR or —NR'R''; each R is independently selected from C1–10 alkyl, alkenyl, or alkadienyl or C6–20 cycloalkyl, aryl, alkaryl or aralkyl groups, any of said groups optionally containing one or more ether oxygen atoms within aliphatic segments thereof and optionally containing one or more functional substituents that are unreactive under polymerizing conditions; and each of R' and R'' is independently selected from C1–4 alkyl; and b) about 10% to about 100% by weight of one or more silicone acrylates having the formula:

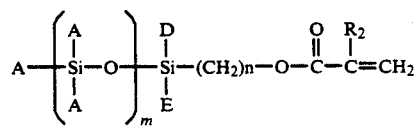

where D and E are selected from the class consisting of C1–C5 alkyl groups, phenyl groups, and G groups; G is a group of the structure

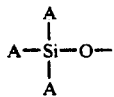

A is selected from the class consisting of C1–C5 alkyl groups and phenyl groups; m is an integer from one to five; R$_2$ is H or CH$_3$ and n is an integer from one to three;

said random or block polymer being attached to a terminal organo group having a polymerizable carbon-carbon double bond.

18. The composition according to claim 17 wherein said macromonomer comprises about 15% to about 60% by weight of said composition.

19. The composition according to claim 18 wherein said silicone acrylate (b) is TRIS(trimethylsiloxy)-3-methacryloxypropylsilane.

20. The composition according to claim 19 wherein said monomer (a) is methyl methacrylate.

21. The composition according to claim 20 wherein said silicone acrylate (b) is TRIS(trimethylsiloxy)-3-methacryloxypropylsilane in an amount ranging from about 15% to about 80% by weight.

22. The composition according to claim 2 wherein said preformed silicone-containing acrylic copolymer is a star polymer comprising:
  a. a crosslinked core comprising a polymer derived from a mixture of monomers comprising:
    i. about 1–100% by weight of one or more monomers, each monomer having at least two polymerizable groups

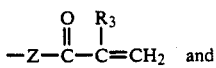

and
    ii. 0–99% by weight of one or more monomers, each having one group

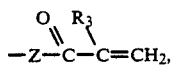

in which R$_3$ is the same or different and is H, CH$_3$, CH$_3$CH$_2$, CN, or COR' and Z is O, or NR' and
  b. attached to said core (a), random or block polymer chains derived from a mixture of monomers comprising:
    i) 0–90% by weight of one or more monomers of the structure

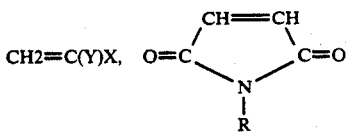

and mixtures thereof wherein:
  X is —CN, —CN=CHC(O)X' or —C(O)X'; Y is —H, —CH$_3$, —CN or —CO$_2$R, provided, however, when X is —CH=CHC(O)X', Y is —H or —CH$_3$; X' is —OSi(R)$_3$, —R, —OR or —NR'R"; each R is independently selected from C1–10 alkyl, alkenyl, or alkadienyl or C6–20 cycloalkyl, aryl, alkaryl or aralkyl groups, any of said groups optionally containing one or more ether oxygen atoms within aliphatic segments thereof and optionally containing one or more functional substituents that are unreactive under polymerizing conditions; and each of R' and R" is independently selected from C1–4 alkyl joined to a block comprising:
    ii). about 10% to about 100% by weight of one or more polysiloxanylalkyl esters of alpha, beta unsaturated acids of the structure:

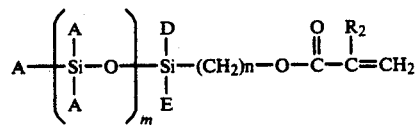

where D and E are selected from the class consisting of C1–C5 alkyl groups, phenyl groups, and G groups;
    G is a group of the structure:

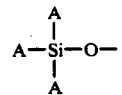

A is selected from the class consisting of C1–C5 alkyl groups and phenyl groups; m is an integer from one to five; R$_2$ is H or CH$_3$ and n is an integer from one to three; and
  c) attached to said random or block polymer (b), an organo group containing a polymerizable carbon-carbon double bond.

23. The composition according to claim 22 wherein said star polymer comprises about 15% to about 60% by weight of said composition.

24. The composition according to claim 23 wherein said polysiloxanylalkyl ester of an alpha, beta unsaturated acid (bii) is TRIS(trimethylsiloxy)-3-methacryloxypropylsilane.

25. The composition according to claim 23 wherein said monomer b i) is methyl methacrylate.

26. The composition according to claim 23 wherein said polysiloxanylalkyl ester of an alpha, beta unsaturated acid (bii) is TRIS(trimethylsiloxy)-3-methacryloxypropylsilane in an amount ranging from about 20% to about 85% by weight.

27. The composition according to claim 22 comprised of a star polymer wherein monomer a(i) is ethylene glycol dimethacrylate.

28. The composition according to claim 27 comprised of a star polymer wherein monomer a(i) is ethylene glycol dimethacrylate, monomer b(i) is methyl methacrylate and monomer b(ii) is TRIS(trimethylsiloxy)-3-methacryloxypropylsilane.

29. A method of making a composition comprising about 10% to about 98% by weight of at least one preformed silicone-containing acrylic copolymer and about 2% to about 90% by weight of a matrix formed from the random polymerization of a mixture of monomers, said monomers being selected from the group consisting of silicone acrylates, esters of alpha, beta-unsaturated acids, wetting monomers and mixtures thereof comprising:
  (1) mixing said monomers to produce a solution;
  (2) adding said preformed copolymer(s) to said solution from (1) to produce a mixture;

(3) agitating said mixture from step (2) for a period sufficient to produce a viscous solution; and (4) polymerizing said mixture from step 3 to produce said composition.

30. The method according to claim 29 wherein said mixture from step 3 is polymerized in the absence of solvent.

31. The method according to claim 29 wherein said preformed silicone-containing acrylic copolymer is a macromonomer comprising a random or block polymer derived from a mixture of monomers comprising:

a) about 0% to about 90% by weight of one or more monomers of the structure:

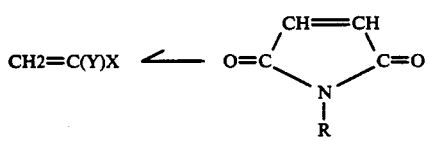

and mixtures thereof wherein: X is —CN, —CN=CHC(O)X' or —C(O)X'; Y is —H, —CH$_3$, —CN or —CO$_2$R, provided, however, when X is —CH=CHC(O)X', Y is —H or —CH$_3$; X' is —O-Si(R)$_3$, —R, —OR or —NR'R''; each R is independently selected from C1-10 alkyl, alkenyl, or alkadienyl or C6-20 cycloalkyl, aryl, alkaryl or aralkyl groups, any of said groups optionally containing one or more ether oxygen atoms within aliphatic segments thereof and optionally containing one or more functional substituents that are unreactive under polymerizing conditions; and each of R' and R'' is independently selected from C1-4 alkyl ; and b) about 10% to about 100% by weight of one or more silicone acrylates of the structure:

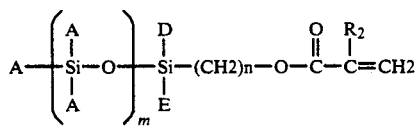

where D and E are selected from the class consisting of C1-C5 alkyl groups, phenyl groups, and G groups; G is a group of the structure

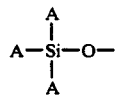

A is selected from the class consisting of C1-C5 alkyl groups and phenyl groups; m is an integer from one to five; R$_2$ is H or CH$_3$ and n is an integer from one to three;

said random or block polymer being attached to a terminal organo group having a polymerizable carbon-carbon double bond.

32. The method according to claim 31 wherein said macromonomer comprises about 15% to about 60% by weight of said composition.

33. The method according to claim 31 wherein said silicone acrylate (b) is TRIS(trimethylsiloxy)-3-methacryloxypropylsilane.

34. The method according to claim 31 wherein said monomer (a) is methyl methacrylate.

35. The method according to claim 29 wherein said preformed silicone-containing acrylic copolymer is a star polymer comprising:

a. a crosslinked core comprising a polymer derived from a mixture of monomers comprising:

i. about 1-100% by weight of one or more monomers, each monomer having at least two polymerizable groups

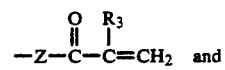

ii. 0-99% by weight of one or more monomers, each having one group

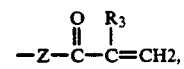

in which R$_3$ is the same or different and is H, CH$_3$, CH$_3$CH$_2$, CN, or COR' and Z is 0, or NR' and b. attached to said core (a), random or block polymer chains derived from a mixture of monomers comprising:

i) 0-90% by weight of one or more monomers of the structure

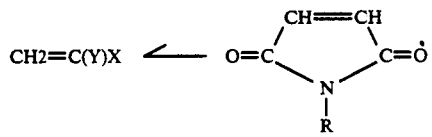

and mixtures thereof wherein:

X is —CN, —CN=CHC(O)X' or —C(O)X'; Y is —H, —CH$_3$, —CN or —CO$_2$R, provided, however, when X is —CH=CHC(O)X', Y is —H or —CH$_3$;

X' is —OSi(R)$_3$, —R, —OR or —NR'R'';

each R is independently selected from C1-10 alkyl, alkenyl, or alkadienyl or C6-20 cycloalkyl, aryl, alkaryl or aralkyl groups, any of said groups optionally containing one or more ether oxygen atoms within aliphatic segments thereof and optionally containing one or more functional substituents that are unreactive under polymerizing conditions; and each of R' and R'' is independently selected from C1-4 alkyl joined to a block comprising:

ii). about 10% to about 100% by weight of one or more polysiloxanylalkyl esters of alpha, beta unsaturated acids of the structure:

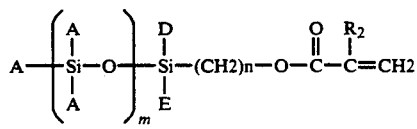

where D and E are selected from the class consisting of C1-C5 alkyl groups, phenyl groups, and G groups;

G is a group of the structure:

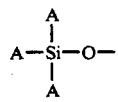

A is selected from the class consisting of C1–C5 alkyl groups and phenyl groups; m is an integer from one to five; $R_2$ is H or $CH_3$ and n is an integer from one to three; and c) attached to said random or block polymer (b), an organo group containing a polymerizable carbon-carbon double bond.

36. The method according to claim 29 wherein said star polymer comprises about 15% to about 60% by weight of said composition.

37. The method according to claim 36 wherein said polysiloxanylalkyl ester (bii) is TRIS(trimethylsiloxy)-3-methacryloxypropylsilane.

38. The method according to claim 29 wherein said monomer b. i) is methyl methacrylate.

39. The method according to claim 35 wherein said polysiloxanylalkyl ester (bii) is TRIS(trimethylsiloxy)-3-methacryloxypropylsilane in an amount ranging from about 20% to about 85% by weight.

40. The method according to claim 29 wherein said star polymer comprises ethylene glycol dimethacrylate as monomer a(i).

41. The method according to claim 29 wherein said star polymer comprises ethylene glycol dimethacrylate as monomer a(i), methyl methacrylate as monomer b(i) and TRIS(trimethylsiloxy)-3-methacryloxypropylsilane as monomer b(ii).

* * * * *